United States Patent [19]

Fujisawa et al.

[11] Patent Number: 4,868,733
[45] Date of Patent: Sep. 19, 1989

[54] DOCUMENT FILING SYSTEM WITH KNOWLEDGE-BASE NETWORK OF CONCEPT INTERCONNECTED BY GENERIC, SUBSUMPTION, AND SUPERCLASS RELATIONS

[75] Inventors: Hiromichi Fujisawa, Tokorozawa; Jun'ichi Higashino; Atushi Hatakeyama, both of Kokubunji, all of Japan

[73] Assignee: Hitachi, Ltd., Tokyo, Japan

[21] Appl. No.: 844,123

[22] Filed: Mar. 26, 1986

[30] Foreign Application Priority Data

Mar. 27, 1985 [JP] Japan .................................. 60-60678

[51] Int. Cl.$^4$ .......................... G06F 7/28; G06F 15/21
[52] U.S. Cl. ..................................... 364/200; 364/513
[58] Field of Search ................. 364/521, 200 MS File, 364/900 MS File, 513

[56] References Cited

U.S. PATENT DOCUMENTS

| | | | |
|---|---|---|---|
| 4,298,957 | 11/1981 | Duvall et al. | 364/900 |
| 4,305,131 | 12/1981 | Best | 364/521 |
| 4,318,184 | 3/1982 | Millett et al. | 364/900 |
| 4,358,824 | 11/1982 | Glickman et al. | 364/200 |
| 4,384,329 | 5/1983 | Rosenbaum et al. | 364/200 |
| 4,420,817 | 12/1983 | Yoshida | 364/900 |
| 4,497,039 | 1/1985 | Kitakami et al. | 364/900 |
| 4,575,798 | 3/1986 | Lindstrom et al. | 364/200 |
| 4,606,002 | 8/1986 | Waisman et al. | 364/200 |
| 4,611,298 | 9/1986 | Schuldt | 364/900 |

OTHER PUBLICATIONS

Avron Barr, The Handbook of Artificial Intelligence, vol. 1, 1981, pp. 180-183.
William A. Woods, IEEE Computer, vol. 16, No. 10, Oct. 1983, pp. 22-27.

Primary Examiner—Archie E. Williams, Jr.
Assistant Examiner—Leo Li Wang
Attorney, Agent, or Firm—Antonelli, Terry & Wands

[57] ABSTRACT

A document filing system is provided for storing a large amount of information in proper arrangement for facilitating utilization thereof by a user, while allowing semantical retrieval to be realized even from vague fragmental information. Further, a method is provided for expressing the facts consitituting information in terms of "concepts" representing things and "relations" defined between the concepts internally of computer, and a method of inputting user's information to a computer through dialogical procedure and retrieving desired information. Information stored of the computer architects internally a concept network which is displayed in various forms such as hierarchical form based on subsumption relations between the concepts, hierarchical representation based on part-whole relation between the concept, a frame display of a single concepts, and tabular representation of a set of concepts belonging to a given class. The network may be browsed by referring to the contents of the display so that a user can easily know what kind of information has been stored internally of the computer, whereby he or she can perform inputting of new information and retrieval of desired information in a facilitated and simplified manner. The relations stored internally of the computer are classified into "generic relationship" and "instance relation" representing individual facts, whereby a generic framework of facts can be stored. The generic framework is displayed upon interaction with the user for allowing new information to be inputted and desired information to be retrieved in a facilitated and simplified manner. Retrieval by using sematic retrieval formula created internally through dialogical procedure is realized through inferring processing.

8 Claims, 24 Drawing Sheets

FIG. 5

| C | | |
|---|---|---|
| C # | CONCEPT (C) NAME | P/S |
| 1 | UNIVERSAL | P |
| ⋮ | ⋮ | ⋮ |
| 58 | COMPUTER | P |
| 58 | (計算機) | S |
| ⋮ | ⋮ | ⋮ |
| 64 | SOFTWARE | P |
| ⋮ | ⋮ | ⋮ |
| 107 | SUPERCOMPUTER | P |
| ⋮ | ⋮ | ⋮ |
| 251 | ARTICLE | P |
| ⋮ | ⋮ | ⋮ |
| 313 | ART #018 | P |
| ⋮ | ⋮ | ⋮ |
| 1051 | UX | P |
| ⋮ | ⋮ | ⋮ |
| 1419 | OPERATING-SYSTEM | P |
| ⋮ | ⋮ | ⋮ |
| 1512 | X-800 | |
| ⋮ | ⋮ | |

C# = CONCEPT IDENTIFICATION NUMBER
C = CONCEPT
P = PRIMARY
S = SECONDARY

FIG. 6

| C # | S # |
|---|---|
| 1 | 1 |
| ⋮ | ⋮ |
| 58 | 1 |
| ⋮ | ⋮ |
| 64 | 1 |
| ⋮ | ⋮ |
| 107 | 58 |
| ⋮ | ⋮ |
| 251 | 1 |
| ⋮ | ⋮ |
| 313 | 251 |
| ⋮ | ⋮ |
| 1051 | 1419 |
| ⋮ | ⋮ |
| 1419 | 64 |
| ⋮ | ⋮ |
| 1512 | 107 |
| ⋮ | ⋮ |

S = SUBSUMPTION RELATIONS (table label)

S# = SUBSUMPTION IDENTIFICATION NUMBER
C# = CONCEPT IDENTIFICATION NUMBER
S = SUBSUMPTION RELATIONS

FIG. 7

| R | | | |
|---|---|---|---|
| RS# | RSNAME | LR | RL |
| ⋮ | | ⋮ | |
| 7 | RUN | RUNS | RUNS-ON |
| ⋮ | | ⋮ | |
| 15 | DEVELOPMENT | HAS-DEVELOPED | IS-DEVELOPED-BY |
| 16 | SUBJECT | IS-SUBJECT-OF | SUBJECT-IS |
| ⋮ | | ⋮ | |
| 21 | AUTHORSHIP | HAS-WRITTEN | IS-WRITTEN-BY |
| 22 | PART-WHOLE 1 | HAS-PART-OF | IS-PART-OF |
| 23 | PART-WHOLE 2 | HAS-PART-OF | IS-PART-OF |
| 24 | PART WHOLE 3 | IS-PART-OF | HAS-PART-OF |
| ⋮ | | | |
| 34 | LOCATION | IS-LOCATED-IN | IS-LOCATION-OF |
| ⋮ | | | |

R = GENERIC RELATIONSHIPS
RS# = GENERIC RELATIONSHIPS IDENTIFICATION NUMBER
RSNAME = GENERIC RELATIONSHIP NAME
LR = LEFT TO RIGHT READINGS OF GENERIC RELATIONSHIPS
RL = RIGHT TO LEFT READINGS OF GENERIC RELATIONSHIPS

FIG. 8

| r | | | | |
|---|---|---|---|---|
| R# | RS# | CL | CR | G/I |
| ⋮ | | ⋮ | | |
| 4 | 7 | 58 | 64 | G |
| 5 | 16 | 1 | 251 | G |
| ⋮ | | ⋮ | | |
| 724 | 7 | 1512 | 1051 | I |
| ⋮ | | ⋮ | | |
| 839 | 16 | 1512 | 313 | I |
| ⋮ | | ⋮ | | | r = INSTANCE RELATIONSHIP
R# = GENERIC RELATIONSHIP IDENTIFYING NUMBER
RS# = TIME OF GENERIC RELATIONSHIP
CL = LEFT CONCEPT IDENTIFYING NUMBER
CR = RIGHT CONCEPT IDENTIFYING NUMBER
G = GENERIC
I = INSTANCE

FIG. 9

| D | | | | | | |
|---|---|---|---|---|---|---|
| D # | C # | SIZE | CODE | DENS | PHYSA | LENG |
| ⋮ | ⋮ | | | | | ⋮ |
| 98 | 313 | A4 | MH | 16 | 400207 | 13 |
| ⋮ | ⋮ | | | | | |

D = DOCUMENT
D# = DOCUMENT IDENTIFICATION NUMBER
C# = CONCEPT IDENTIFICATION NUMBER
DENS = IMAGE SCANNING DENSITY
PHYSA = PHYSICAL ADDRESS
LENG = NUMBER OF RECORD SECTORS

FIG. 11

| NO | * DATABASE |
|----|------------|
| 1  | acm Trans. on Database Systems |
| 2  | ACM-DATABASE-SYSTEMS-5-4 |
| 3  | ACM-DATABASE-SYSTEMS-9-2 |
| 4  | Conceptual graphs for a database interface |
| 5  | Coreference in a frame database |
| 6  | DATABASE-INTERFACE |
| 7  | DATABASE-MODEL |
| 8  | DBMS. DATABASE-MANAGEMENT-SYSTEM |
| 9  | RABBIT: An Intelligent Database Assistant |
| 10 | RELATIONAL-DATABASE-MANAGER |
| 11 | RELATIONAL-DATABASE-SYSTEMS-INC |

? NUMBER : 7

FIG. 12

BROWSE > 1

| NO | UNIVERSAL |
|----|-----------|
| 1  | ABSTRACT-RELATIONS |
| 2  | AFFECTIONS |
| 3  | CONCEPT |
| 4  | EVENT |
| 5  | INTELLECT |
| 6  | MATTER |
| 7  | SCIENCE. TECHNOLOGY |
| 8  | SENSATION |
| 9  | UNIVERSAL |
| 10 | VOLITION |

FIG. 13

BROWSE > 6
BROWSE > 1

| NO | MATTER |
|---|---|
| 1 | INORGANIC - MATTER |
| 2 | ORGANIC - MATTER |

BROWSE > 1
BROWSE > 1

| NO | INORGANIC - MATTER |
|---|---|
| 1 | HUMAN - CREATION |
| 2 | NATURAL - MATERIAL |

BROWSE > 1
BROWSE > 1

| NO | HUMAN - CREATION |
|---|---|
| 1 | MACHINERY. DEVICE |
| 2 | ORGANIZATION. WORKPLACE |
| 3 | PAPER - MATERIAL |
| 4 | SOFTWARE |
| 5 | SYSTEM. STRUCTURE |

BROWSE > 2
BROWSE > 1

| NO | ORGANIZATION. WORKPLACE |
|---|---|
| 1 | ACADEMIC - ASSOCIATION |
| 2 | CENTER |
| 3 | COLLEGE. UNIVERSITY |
| 4 | COMPANY |
| 5 | GROUP |
| 6 | LIBRARY. BOOKROOM |
| 7 | OFFICE |
| 8 | RESEARCH - LAB |
| 9 | SCHOOL. DEPARTMENT |
| 10 | WORKS. FACTORY |

FIG. 16

```
BKOWSE> *sowa
BROWSE> fr *
```

| J. F. SOWA. | CONCEPT | NO |
|---|---|---|
| IS-A | MAN | 1 |
| IS-AUTHOR-OF | PAPER #0012 | 2 |
| IS-AUTHOR-OF | BOOK #0007 | 3 |
| NATIONALITY-IS | USA | 4 |
| WORKS-AT | IBM Systems Research Institute | 5 |

```
BROWSE> fr 2
```

| PAPER #0012 | CONCEPT | NO |
|---|---|---|
| IS-A | TECH-PAPER | 1 |
| AUTHOR-IS | J. F. SOWA | 2 |
| IS-IN-PAGES-OF | 336-357 | 3 |
| IS-PART-OF | IBM-RES & DEV-76-20 | 4 |
| SUBJECT-IS | DATABASE-INTERFACE | 5 |
| TITLE-IS | Conceptual graphs for a database interface | 6 |

```
BROWSE> fr 4
```

| IBM-RES & DEV-76-20 | CONCEPT | NO |
|---|---|---|
| IS-A | IBM J. Research and Development | 1 |
| HAS-PART-OF | PAPER #0012 | 2 |
| IS-PUBLISHED-BY | IBM-CORP | 3 |

```
BROWSE> fr 3
```

| IBM-CORP | CONCEPT | NO |
|---|---|---|
| IS-A | COMPANY | 1 |
| HAS-ANNOUNCED | ARTICLE #0011 | 2 |
| HAS-DEVELOPED | SERIES-I-MINICOMPUTER | 3 |
| HAS-PART-OF | IBM Systems Research Institute | 4 |
| HAS-PART-OF | WORKS. FACTORY | 5 |
| IS-LOCATED-IN | USA | 6 |
| PRODUCES | CPIX | 7 |
| PRODUCES | SERIES-I-MINICOMPUTER | 8 |
| PUBLISHES | IBM J. Research and Development | 9 |

FIG. 17

```
BROWSE > man
MAN

BROWSE> crc  mr. superman *
(MR. SUPERMAN (IS-A MAN))
% OK OR NO....OK
MR. SUPERMAN BROWSE> crr *
MR. SUPERMAN  HAS PROPOSED [INORGANIC-MATTER] : computer
MR. SUPERMAN  HAS PROPOSED [COMPUTER] : OK
MR. SUPERMAN  HAS TITLE OF [ACADEMIC-TITLE] : phd
MR. SUPERMAN  HAS TITLE OF [PHD] : OK
MR. SUPERMAN  IS A [JOB-POSITION] chief-researcher
MR. SUPERMAN  IS A [CHIEF-RESEARCHER] : OK
MR. SUPERMAN  IS A MEMBER OF [ACADEMIC-ASSOCIATION] : aaai
MR. SUPERMAN  IS A MEMBER OF [AAAI] : OK
MR. SUPERMAN  IS AUTHOR OF [ARTICLE] : OK
MR. SUPERMAN  IS AUTHOR OF [PUBLISHED-MATERIAL] : BOOK
MR. SUPERMAN  IS AUTHOR OF [BOOK] : OK
MR. SUPERMAN  IS EDITOR OF [PUBLISHED-MATERIAL] : OK
MR. SUPERMAN  IS PERSON TO CONTACT FOR [CONFERENCE] : OK
MR. SUPERMAN  IS SUBJECT OF [PUBLISHED MATERIAL] : OK
MR. SUPERMAN  IS SUBJECT OF [ARTICLE] : OK
MR. SUPERMAN  WHOSE NATIONALITY IS [COUNTRY. NATIONALITY] : japan
MR. SUPERMAN  WHOSE NATIONALITY IS [JAPAN] : OK
MR. SUPERMAN  WORKS AT [ORGANIZATION. WORKPLACE] : hitachi-ltd
MR. SUPERMAN  WORKS AT [HITACHI-LTD] : OK The followings are to be added to database.

((HAS-PROPOSED COMPUTER) (HAS TITLE OF PHD) (IS-A CHIEF-RESEARCHER)
 (IS-A-MEMBER-OF AAAI) (IS-AUTHOR OF BOOK)
 (NATIONALITY-OF-*-IS JAPAN) (WORKS-AT HITACHI-LTD))

Do you want to add them ? (y/n) y
```

FIG. 19

```
BROWSE > article
BROWSE > q
— I'm thinking which questions to be asked
— Please add information you have.
```

| ARTICLE | CONCEPT | NO |
|---|---|---|
| IS-IN-PAGES-OF | PAGE | 1 |
| IS-PART-OF | PUBLISHED-MATERIAL | 2 |
| IS-REFERRED-TO-FROM | ARTICLE | 3 |
| IS-REFERRED-TO-FROM | PUBLISHED-MATERIAL | 4 |
| SUBJECT-IS | UNIVERSAL | 5 |
| TITLE-IS | TITLE. HEADLINE | 6 |

```
(ARTICLE)
?NUMBER : 5
ARTICLE WHOSE SUBJECT IS {UNIVERSAL} : computer
ARTICLE WHOSE SUBJECT IS {COMPUTER} : q
```

FIG. 20

— I'm thinking which questions to be asked.
— Please add information you have.

| COMPUTER | CONCEPT | NO |
|---|---|---|
| HAS-INTERFACE-OF | INTERFACE-DEVICE | 1 |
| HAS-PART-OF | MACHINERY.DEVICE | 2 |
| IS-ATTACHED-TO | COMPUTER | 3 |
| IS-DEVELOPED-AT | ORGANIZATION.WORKPLACE | 4 |
| IS-EQUIVALENT-TO | HUMAN-CREATION | 5 |
| IS-PRODUCED-BY | ORGANIZATION.WORKPLACE | 6 |
| IS-SUBJECT-OF | PUBLISHED-MATERIAL | 7 |
| IS-SUBJECT-OF | ARTICLE | 8 |
| IS-SUBJECT-OF | CONFERENCE | 9 |
| RESEMBLES | MATTER | 10 |
| RUNS | COMPUTER-SOFT | 11 |
| RUNS | PROGRAMMING-LANGUAGE | 12 |
| RUNS-UNDER | OS.OPERATING-SYSTEM | 13 |

(COMPUTER)
?NUMBER : 4
COMPUTER IS DEVELOPED AT {ORGANIZATION.WORKPLACE} : company
COMPUTER IS DEVELOPED AT {ORGANIZATION.WORKPLACE} : company
COMPUTER IS DEVELOPED AT {COMPANY} : q

FIG. 21

— I'm thinking which questions to be asked.
— Please add information you have.

| COMPANY | CONCEPT | NO |
|---|---|---|
| HAS-ANNOUNCED | NEWS. ARTICLE | 1 |
| HAS-DEVELOPED | MACHINERY. DEVICE | 2 |
| HAS-DEVELOPED | COMPUTER-SOFT | 3 |
| HAS-DEVELOPED | SYSTEM. STRUCTURE | 4 |
| HAS-EMPLOYEE-OF | PERSON | 5 |
| HAS-PART-OF | ORGANIZATION. WORKPLACE | 6 |
| IS-LOCATED-IN | SPACE. PLACE. LOCATION | 7 |
| IS-PART-OF | ORGANIZATION. WORKPLACE | 8 |
| PRODUCES | MACHINERY. DEVICE | 9 |
| PUBLISHES | PUBLISHED-MATERIAL | 10 |

(COMPANY)
?NUMBER: 7
COMPANY IS LOCATED IN (SPACE. PLACE. LOCATION) : * cal
COMPANY IS LOCATED IN (CALIFORNIA) : OK

FIG. 22

| COMPUTER | CONCEPT | NO |
|---|---|---|
| HAS-INTERFACE-OF | INTERFACE-DEVICE | 1 |
| HAS-PART-OF | MACHINERY. DEVICE | 2 |
| IS-ATTACHED-TO | COMPUTER | 3 |
| IS-DEVELOPED-AT | ORGANIZATION.WORKPLACE | 4 |
| IS-EQUIVALENT-TO | HUMAN-CREATION | 5 |
| IS-PRODUCED-BY | ORGANIZATION. WORKPLACE | 6 |
| IS-SUBJECT-OF | PUBLISHED-MATERIAL | 7 |
| IS-SUBJECT-OF | ARTICLE | 8 |
| IS-SUBJECT-OF | CONFERENCE | 9 |
| RESEMBLES | MATTER | 10 |
| RUNS | COMPUTER-SOFT | 11 |
| RUNS | PROGRAMMING-LANGUAGE | 12 |
| RUNS-UNDER | OS. OPERATING-SYSTEM | 13 |

(COMPUTER (IS-DEVELOPED-AT (COMPANY (IS-LOCATED-IN CALIFORNIA))))
?NUMBER:13
COMPUTER RUNS UNDER (OS OPERATING-SYSTEM): unix
COMPUTER RUNS UNDER {UNIX} :OK

FIG. 24

| ARTICLE #0014 | CONCEPT | NO |
|---|---|---|
| IS-A | NEWS. ARTICLE | 1 |
| IS-ANNOUNCED-BY | HP. HEWLETT-PACKARD-CO | 2 |
| IS-PART-OF | ELECTRONICS-821130 | 3 |
| SUBJECT-IS | HP-9000 | ④ |
| SUBJECT-IS | 32-PROCESSOR-CHIP-BY-HP | 5 |
| TITLE-IS | HP taps Unix for 2ll its lines | 6 |

3001

| SUPERMINICOMPUTER | CONCEPT | NO |
|---|---|---|
| IS-A | COMPUTER | 1 |

3004

| HP. HEWLETT -PACKARD-CO | CONCEPT | NO |
|---|---|---|
| IS-A | COMPANY | 1 |
| HAS-ANNOUNCED | ARTICLE # 0014 | 2 |
| HAS-DEVELOPED | HP-9000 | 3 |
| HAS-DEVELOPED | 32-PROCESSOR-CHIP-BY-HP | 4 |
| HAS-DEVELOPED | HP-3000 | 5 |
| IS-LOCATED-IN | PALO-ALTO | ⑥ |
| PRODUCES | HP-9000 | 7 |
| PRODUCES | 32-PROCESSOR-CHIP-BY-HP | 8 |
| PRODUCES | HP-3000 | 9 |

3003  3033

| HP-9000 | CONCEPT | NO |
|---|---|---|
| IS-A | SUPERMINICOMPUTER | ① |
| HAS-PART-OF | 32-PROCESSOR-CHIP-BY-HP | 2 |
| IS-DEVELOPED-AT | HP. HEWLETT-PACKARD-CO | ③ |
| IS-PRODUCED-BY | HP. HEWLETT-PACKARD-CO | 4 |
| IS-SUBJECT-OF | ARTICLE #0014 | 5 |
| RUNS-UNDER | UNIX | ⑥ |

3002  3031  3032

| PALO-ALTO | CONCEPT | NO |
|---|---|---|
| IS-A | CITY | 1 |
| IS-LOCATION-OF | HP.HEWLETT-PACKARD-CO | 2 |
| IS-PART-OF | CALIFORNIA | ③ |

3005  3034

| CALIFORNIA | CONCEPT | NO |
|---|---|---|
| IS-A | PREFECTURE. STATE | 1 |
| HAS-PART-OF | CUPERTINO | 2 |
| HAS-PART-OF | LOS-GATOS | 3 |
| HAS-PART-OF | SAN-FRANCISCO | 4 |
| HAS-PART-OF | MOUNTAIN-VIEW | 5 |
| HAS-PART-OF | PALO-ALTO | 6 |
| HAS-PART-OF | HENLO-PARK | 7 |
| HAS-PART-OF | LOS-ANGELS | 8 |
| HAS-PART-OF | SUNNYVALE | 9 |
| IS-PART-OF | USA | 10 |

3007  3036

| UNIX | CONCEPT | NO |
|---|---|---|
| IS-A | OS. OPERATING-SYSTEM | 1 |
| IS-DEVELOPED-AT | ATLT Bell Lab | 2 |
| IS-SUBJECT-OF | ARTICLE #0002 | 3 |
| RESEHBLES | CPIX | 4 |
| RUNS | C | 5 |
| RUNS-ON | HP-900 | 6 |
| RUNS-ON | VAX-II | 7 |

NEWS. ARTICLE
BROWSE > tab *

| NO | RELATIONSHIP |
|----|--------------|
| 1 | IS-ANNOUNCED-BY |
| 2 | IS-A |
| 3 | AUTHOR-IS |
| 4 | IS-PART-OF |
| 5 | SUBUJECT-IS |
| 6 | TITLE-IS |

NUMBERS > 6 5 0

| NEWS. ARTICLE | TITLE-IS | SUBJECT-IS |
|---------------|----------|------------|
| ARTICLE #0001 | All-optical. bidirectional local network | OB-LAN-0001 |
| ARTICLE #1001 | The coming surge in data-base systems | DBMS. DATABASE-MANAGEMENT-SYSTEM |
| ARTICLE #0002 | Bell. DEC announce supprt for Unix | UNIX |
| ARTICLE #0003 | New Apples might. compete head on | APPLE-LISA<br>APPLE-MACINTOSH<br>TO-5000<br>THE-8001 |
| ARTICLE #0004 | Desktop OCR reads six fonts | |
| ARTICLE #0005 | Ethernet data link controller is single chip | |
| ARTICLE #0006 | Optical check reader speeds bank processing | SERIES-800 |
| ARTICLE #0007 | Graphic Station Can Stand Alone | METAPHOR-WORK-STATION |
| ARTICLE #0008 | S-100 peripheral card converts text input into | CP-5100 |

F-B-E:0

DOCUMENT FILING SYSTEM WITH KNOWLEDGE-BASE NETWORK OF CONCEPT INTERCONNECTED BY GENERIC, SUBSUMPTION, AND SUPERCLASS RELATIONS

BACKGROUND OF THE INVENTION

1. Field of the Invention

The present invention relates to an information storage and retrieval system which permits storage, retrieval and display of information such as documents, drawings, photographs and the like in such a manner in which common users can easily manipulate the system for the storage and/or retrieval of information.

2. Description of the Prior Art

Heretofore, management of a data base which permits storage and retrieval of an enormous amount of information has been relied on by those skilled in the art. The information is available to the end user only through the medium of experts. However, in accompaniment to the development of small size storage devices of a large capacity such as optical disks, there are realized document filing systems for office use which can be directly manipulated by the end users. Further, word processors have increasingly come into wide use. Under the circumstances, there is an increasing tendency that a large amount of documents are stored in electronic devices.

Heretofore, items, such as documents, are managed in tabular form listing bibliographic data such as identification names, titles and author's names attached to the documents, and attempts have been made to facilitate the retrieval of information by assigning keywords or classification codes thereto. Nevertheless, there arise problems mentioned below.

In most of the computer file systems, the file management is performed with the aid of identification names (each composed of ca. 20 characters). However, difficulty is often encountered in naming the document or file so that it can be readily recalled. Besides, searching the file on the basis of the character string which constitutes the name while inferring the contents from the name is an extremely difficult job even for the user who has prepared the name himself.

Since the bibliographic data are objective items, registration thereof can be easily made. However, there scarcely arises the situation in which the bibliographic data are made use of as means for retrieval. Utilization of the bibliographic data as the aid for the retrieval is restricted to the rare case in which the document to be retrieved is clearly known to the user as the source or reference literature.

In most cases of the retrieval of documents, the title ambigously memorized by user or the contents thereof provides a clue for the retrieval. To this end, keywords and classification codes are employed. However, difficulty is encountered in assigning the keywords or classification codes to the documents upon registration thereof. In other words, it is difficult to determine the keyword which makes it possible to retrieve properly the associated document later on. By way of example, it is assumed that many keywords are attached to a document so that it can be retrieved, as viewed from various perspective. This however means that a number of keywords which are useless for retrieval are employed. If the number of the keywords is decreased, uncertainty arises as to the correct selection for retrieval. In the data base for literatures, preparation and allocation of the keywords have heretofore been relied on by those skilled in the art.

Moreover, difficulty is often encountered in recalling the keyword itself. By way of example, upon preparation of the retrieval formula composed of the keywords for the retrieval of a document, literatures having a resemblance to the desired one are searched out from a general list for picking up their keywords, which are then referred to for determining the keywords possibly allocated to the desired document. Such procedure is not rare and tells how difficult it is to recall the keyword.

In the case of filing documents through classification, ambiguity of the taxonomic tree (hierarcal tree) as well as confusion of the taxonomic trees (i.e. multiple classifications of one document) provide problems. Further, standards for the classification vary as passes. A span of several years will make the classification standards useless, giving rise to another problem.

Under the circumstance, easy management and retrieval of information for the user provide extremely important problems remaining to be solved in the hitherto known document filing systems.

As n attempt to cope with the above problems, there has been proposed a method of diagraming the retrieval conditions and deriving a formal query formula for the retrieval by using natural language, as disclosed in J. F. Sowa's "Cohceptual graphs for a Data Base Interface" IBM J. Research and Development, Vol. 20, 1976, p.p. 336-357. Furthermore, a method of assisting creation of the conditional formula for retrieval by presenting knowledge concerning the contents of a data base from a computer is known, as disclosed in F. N. Tou et al's "RABBIT: An Intelligent Database Assistant", Proceedings of National Conference of AAAI, 1982, p.p. 314-318. These methods are intended only for assisting the retrieval from the data base. No teachings are disclosed as to the assistance of storage of information for the updating purpose.

In the filing of documents by the end user, registration of new documents as well as maintenance of the file system (e.g. reexamination as to pertinency of classification) is important for realizing the facilitated retrieval. The approaches mentioned above do not meet this requirement.

Finally, the retrieval is accompanied by still another problem. Namely, no measures are available for reexamining the old information from the view point of a new concept which has not yet been clearly defined at the time the old information was stored or for retrieving from the new point of view. By way of example, there often occurs such case in which classification is to be modified from the new viewpoint or in a manner specific to the user himself after lapse of several years. In this way, possibility of rearrangement of information as well as alteration of retrieval also provide important factors for enhancing the easy usability of the information storage and retrieval system.

SUMMARY OF THE INVENTION

An object of the present invention is to solve the problems mentioned above and provide an information storage and retrieval system which allows the user to retrieve the desired document from ambiguous or vague and fragmentary (partial) information in a facilitated and simplified manner while making it easy to enter or register documents and other information.

In view of the above and other objects which will be more apparent as description proceeds, there is provided according to a general aspect of the invention an information storage system in which a mechanism of storing information in the machine is so arranged as to be compatible or comparable to the user's memorization mechanism and thinking process so that the end user can easily understand manipulation of the system to thereby enhance the facilitated usability thereof.

More specifically, the invention contemplates to make it possible to facilitate registration of new information and the inputting of conditions for retrieval, realizing semantically meaningful retrieval, and adapting the retrieval for diversity of viewpoints.

To this end, the system according to the invention is imparted with the novel functions mentioned below:

(1) Supporting function for registration.

For registration of new documents, it is necessary to input the subject matter and the nature or class thereof in addition to the entry of the bibliographic items (author's name, title, the sources and others). Further in order to realize semantic retrieval, it is required to additionally provide more detailed or concrete information. By way of example, suppose that the subject matter is a computer. Then, there may be required such information as "what kind of computer it is", "what characteristics it has", "what company has developed it", "where the company is located", "which country the location belongs to", and so forth. When the information mentioned above is stored, it is possible to retrieve with the aid of inference function "the document concerning a computer developed by a certain company located in a country A and having characteristic features B".

According to the teachings of the invention, knowledge about the concepts "computer", "company" and others is stored in the storage system, wherein upon addition of new information, the user is given instruction as to what kind of property data should be inputted through dialogical procedure, so that he or she can input the data within a short time without being accompanied with entry of erroneous or false information.

In the case where information or similar property has been already registered, such function is realized which allows only the property differing from that of the above information to be inputted without need for entering all the property data of information to be newly inputted, to thereby facilitate the inputting procedure. By way of example, suppose a case in which a man named "John Smith" has been already registered and his brother named "George Smith" is to be newly registered. In that case, by selecting "John Smith" as a similar concept, the system displays a list of the properties of this concept, for example, in a manner as follows:

(FATHER-IS "Davise Smith")

(MOTHER-IS "Samanser Smith")

(BIRTHDAY-IS "May 4, 1960")

(SEX-IS "male")

(HOBBY-IS "music")     (1)

Then, the user can input the properties of the concept "George Smith" that differ from the above, e.g. (BIRTHDAY-IS "June 7, 1963") and (HOBBY-IS "sport").

(2) Supporting Function for retrieval condition input.

When the end user is going to perform the retrieval of a document, it is common that he or she has only an ambiguous image or concept of the document and has difficulty in expressing it in the natural language.

According to the teaching of the present invention, the retrieval is started from the most important concept and information is sequentially added through dialogical procedure or interaction. To this end, the knowledge of the world model conserving the content of the filed documents is stored in the system as is the case with the registration assistance function. On the basis of the knowledge, the names of properties which can be inputted and the concept (class of things) to which the properties may belong are presented to the user.

By way of example, suppose that what the user wants is "technical paper". Then, the user inputs "technical paper". The system knows that "technical paper" has properties such as "author", "title", "subject matter" and others. Accordingly, the system displays on a terminal CRT sets of names of such properties and concepts such as (author, name), (title, text).. and (subject, concept). The user who observes the display in turn inputs the selected data which the user memorizes as the relevant information. For example, "subject" is selected and "computer" is inputted. This process can be recursively repeated. In the above example, when the "computer" is inputted as the selected subject, the system in turn displays (DEVELOPED-BY ORGANIZATION COMPANY), (RUNS COMPUTER-LANGUAGE), (RUNS-UNDER OS) and others. In response thereto, the user will input (RUNS LISP) as the additional condition for retrieval.

By virtue of the assistance function mentioned above, there can be established the retrieval condition as follows:

"Technical paper about computer in which LISP
runs and which is written by an employee of company A"     (2)

As will be described in detail hereinafter, the above retrieval condition is expressed in the formula or expression as follows:

(TECHNICAL-PAPER
  (SUBJECT-IS
    (COMPUTER (RUNS LISP))
  (AUTHOR-IS
    (EMPLOYEE (WORKS-AT COMPANY A))))     (3)

The above expression is based on symbolic expression (S-expression) in LISP Language (refer to P. H. Winston "LISP" Addison-Wesley Publishing Co., 1981, p. 18).

(3) Semantic retrieval function.

It is common that a user who wants to retrieve a certain item has only fragmentary and ambiguous information thereof. On the other hand, the computer memory (e.g. data base) stores that item in a concrete name. The gap between the user's fragmentary information and the precise data stored in the computer memory must be bridged.

In this connection, the ambiguity may be generally classified into five varieties mentioned below:

(i) Incompleteness of name

Only a part of the name of an item or concept is memorized.

(ii) Synonym

The same thing is often memorized or recalled in terms of different words. By way of example, words "artificial intelligence", "thinking machine", and "AI" indicates the same concept.

(iii) Incompleteness of number.

It is rare that a user remembers numerical values precisely, as exemplified by "during the generation of 1980s", "about 1985", "from 1983 to 1987", "before 1960" and so on.

(iv) Taxonomic conceptual abstraction −1

Things and concepts are often memorized in terms of concepts of higher rank with the concrete contents being forgotten. Memorization of the is often based on the classification of concept, as exemplified by sayings that "although the name of the company is forgotten, the organization is neither university nor laboratory but a company at any rate", "that was a certain electric machinery manufacturer" or the like.

In this case, assuming that the electric machinery manufacturer is "ABC Co., Ltd.", for example, the following relations hold true.

("ABC Co., Ltd." IS-A
ELECTRIC-MANUFACTURER)

(ELECTRIC-MANUFACTURER IS-A
MANUFACTURER)

Schematically, the concepts "ABC Co., Ltd." and "ELECTRIC-MANUFACTURER" are coupled by a link "IS-A". Herein, the link "IS-A" represents a relation defined between the two concepts mentioned above and is referred to as the subsumption relation which is an ordered relation representing a superclass relation between two concepts.

In general, it is believed that all the concepts constitute a hierachial taxonomy by means of the link "IS-A". The resulting hierachical tree is referred to as a concept tree or conceptual tree.

(v) Partomic conceptual abstraction −2

The abstraction discussed above is a sort of set theoretical abstraction. It should be pointed out that people often memorizes a thing in terms of upper rank part in part-whole relation of a concept. For example, man says that "although I can not remember the factory where Mr. A works, I am sure that he is an employee of ABC Co., Ltd." or "although I can not remember what the city is called, I am sure that the city is located in the state of California".

In contrast, the conventional data base stores the corresponding facts in more definite manner such as "Mr. A works at XYZ factory" or "ABC Co., Ltd., is located at Los Angeles". Accordingly, the information stored in the data base can not be retrieved starting from the ambiguous information memorized by the user.

In this case, the following relations play an important role.

("ABC Co., Ltd." HAS-PART-OF "XYZ factory")

("California state" HAS-PART-OF "Los Angeles").

What is important to be noted is ("LosAngeles" IS-A "California state")

is not correct, but should be (LosAngeles IS-PART-OF "California state").

These relations "IS-PART-OF" and "HAS-PART-OF" are referred to as "part-whole" relations which are ordered relations representing a structural inclusion relationship between two concepts.

This relation should be clearly distinguished from the subsumption relation described above. Parenthetically, it should be mentioned that the relation "IS-PART-OF" is a reverse relation of "HAS-PART-OF".

In more strict sense, the relation having directivity is referred to, simply as the relation, while the relation is referred to as the relationship when the direction is not concerned.

As to a person's memorization faculty or characteristic, it may further be pointed out that relation between the concepts is more susceptible to be memorized than the concepts themselves. For example, in the case of retrieval starting from such fragmentary ambiguous information that "the subject matter of a certain article is an operating system which was developed by an institute in U.S.A.", the fact "developed" is important, and this fact represents "relation" defined between the two concepts "operating system" and "institute". In more concrete, retrieval condition may be expressed as follows:

("UX OPERATING SYSTEM"
IS-DEVELOPED-BY
"INSTITUTE B")

wherein "IS-DEVELOPED-BY" represents the relation. In the retrieval based on the ambiguous information, this "relation" defined among the concepts is important.

Among the characteristics of a person's memorizing faculty, the incompleteness of name and numerical values are taken into consideration in the hitherto known information retrieval. For example, there can be mentioned the matching function of fragmentary (partial) character string and designation of numerical range. The semantic retrieval function according to the invention is characterized above all by the conceptual abstractions among the classified varieties described above. More specifically, with the aid of the retrieval condition input supporting function, the semantically ambiguous retrieval is rendered possible, as follows:

| Retrieval Condition: | "Article concerning a computer developed by a certain company located in California state and in which an operating system developed by a certain institute runs" (4) |

In the above conditional statement, the concrete concept is only "California state". Other words which may possibly be used as keywords are "computer", "institute", and "operating system". Through the hitherto known information retrieval system, e.g. keyword retrieval system, any satisfactory results of retrieval can not be obtained. It is however noted that the conditional statement (4) is considered a "semantic meaningful retrieval condition" according to the invention, because the statement (4) contains relations between "California state" and "company", "company" and "computer", and "operating system" and "computer", respectively, as the information for retrieval. Further, in the sense that "company", "computer", "operating system" are generic name (abstract concepts), the so-called "abstract" retrieval is realized. In contrast, in the case of the hitherto known retrieval system, since the relations between keywords are not stated, the above statement (4) may be erroneously interpretted as "article about computer introduced by an institute located in California state and in which operating system developed by a certain company runs", which is of course "semantically meaningless retrieval".

BRIEF DESCRIPTION OF THE DRAWINGS

FIGS. 5 to 8 are views illustrating concrete examples of knowledge representation by the concept relation model;

FIG. 9 is a view illustrating an example of image data management;

FIG. 11 is a view for illustrating a result of character substring matching procedure;

FIG. 12 is a view showing a menu;

FIG. 13 is a view for illustrating network traverse procedure based on selection from the menu;

FIG. 16 is a view for illustrating network traverse procedure based on concept frames;

FIG. 17 is a view for illustrating method for definition and registration of a new concept;

FIGS. 19 to 22 are views for illustrating dialogical retrieval formula creating procedure;

FIG. 24 is a view for illustrating a concept matching procedure; and

FIG. 25 is a view for illustrating functions for displaying concepts in tabular form.

DESCRIPTION OF THE PREFERRED EMBODIMENTS

In the following, the present invention will be described in detail in conjunction with the exemplary or preferred embodiments thereof by referring to the accompanying drawings.

Figure 1:
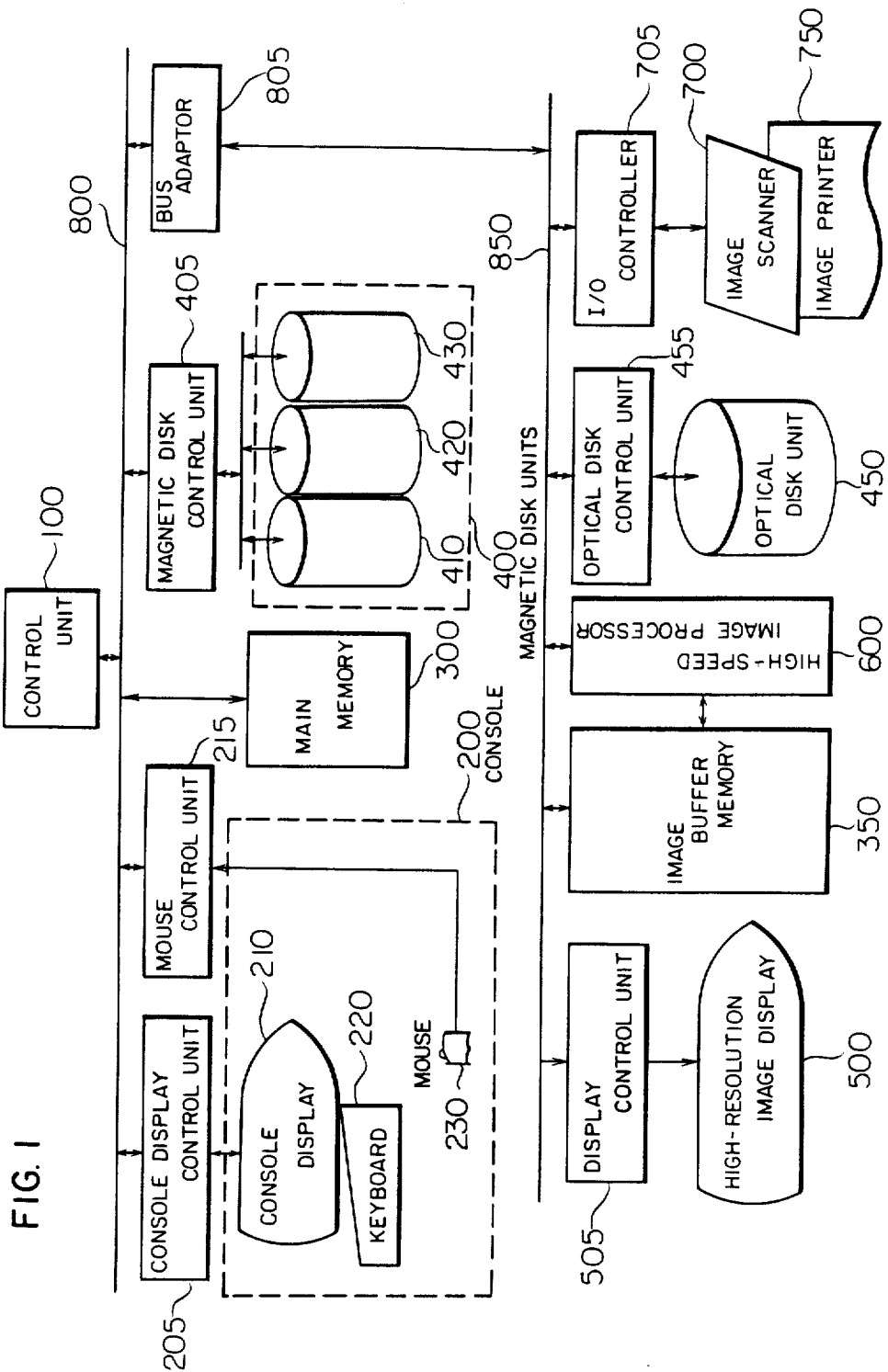
FIG. 1 is a view showing a system arrangement according to an embodiment of the present invention.

FIG. 1 shows a general arrangement of an image information filing system in which an information storage and retrieval system according to an exemplary embodiment of the invention is adopted. Initially, the structure and operation of the whole system will be outlined below.

Basically, the system is composed of a data processing portion and an image information processing portion. The data processing portion comprises a control unit (also referred to as CPU) 100, a main memory 300, magnetic disk units 400 and a terminal console 200 (which includes a CRT 210, a keyboard 220 and a mouse 230) and an image information processing portion. On the other hand, the image information processing portion comprises an image scanner 700, an image printer 750 an optical disk unit 450, an image buffer memory 350, a high-speed image processor (also referred to as IP) 600 and a high-resolution image display (also referred to as CRT) 500. The data processing portion and the image information processing portion are interconnected through a bus adapter 805.

As main operations to be performed, there can be mentioned registration of image information from documents, retrieval of desired information for display or other type of outputting thereof, and inputting and editing of information or data belonging to the field to be filed. In the registration of the image knowledge of a document, the latter is scanned through the image scanner 700, wherein the resulting image information is loaded in the image buffer memory 350 and stored in the optical disk unit 450 after having been coded in a compressed form by the high-speed image processor or IP 600. At that time, the image information in the buffer memory 350 is displayed on the image display or CRT 500 to check whether the image information has been properly digitized, while bibliographic data of the document (such as subject or title, author, the source and others) as well as significance thereof in the world knowledge are inputted through the terminal console 200. The bibliographic data, physical addresses (pack address, track address and sector address) of the image information in concern on the optical disk unit 450 and properties of the image (size, scan density, type of coding as adopted and the like) are stored in the magnetic disk unit or file unit 420. On the other hand, information about the significance of the document in the world knowledge and the like is stored in the file unit 430.

In the retrieval and display operation, the desired document is identified with the aid of the terminal console 200 through dialogical interacting process described hereinafter to be thereby displayed on the image display CRT 500. When a hard copy is desired, this can be outputted from the printer 750. Information about the location of the identified document (such as the physical address of the optical disk unit) is read out from the file unit 420 to be subsequently sent to the optical disk control unit 450 as the control command for reading the optical disk by way of the bus adapter 805. The image information or data thus read out is once stored in the buffer memory 350 and is sequentically decoded through the IP 600 to be displayed.

The mouse 230 is capable of designating the display position or location on both the CRTs 210 and 500. Accordingly, the display position of the image on the CRT 500 is designated by the mouse 230. By taking advantage of this function, the document images on a plurality of pages can also be displayed at given locations or positions on the CRT in overlapping relation. Furthermore, the document image corresponding to one page can be displayed in a reduced size through the IP 600, for thereby allowing a number of ges to be simultaneously displayed on a single CRT screen. Management of images to be displayed on the CRT is performed by the control unit or CPU 100.

Inputs for editing the world knowledge are performed on the terminal 200 by displaying the document on the CRT 500, as it is required. The phrase "world knowledge", is intended to mean a set of concepts concerning the world or field described in the document and the facts described in terms of relationships among the concepts, which document is to be registered or has already been registered. Further, the term "world knowledge" encompasses these concepts, as well as the interconceptural relationships, in a natural language. Needless to say, the document itself is included as one of the concepts by the term "world". These knowledges are stored in the file unit 430.

The three main functions described above can be arbitrarily called in a modeless manner whenever they are required. By way of example, information as required can be displayed on the CRT 500 by resorting to the retrieval function in the course of performing the additional editing of the world knowledges. It is also possible to additionally file the knowledge of the contents of a document in the course of performing the registration of the same document.

Figure 2:
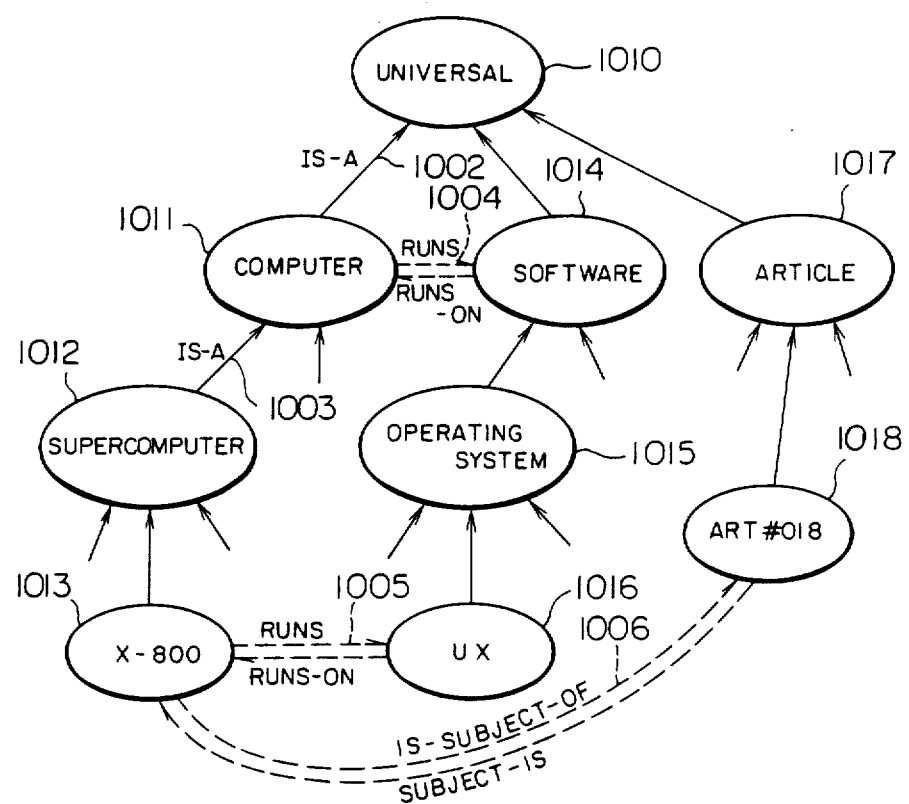
FIG. 2 is a view for illustrating a concept network.

Next, discussion will be directed to the representation format of the world knowledge data. The representation of knowledge is made in terms of two varieties of elements, i.e. the concepts and the relation(s) between or among the concepts. FIG. 2 is a schematic diagram illustrating conceptually these elements in terms of a kind of a semantic network. In the figure, each node represented by an ellipse represents a concept, wherein the word written within the ellipse is typical word representing that concept. This word is referred to as the name of the concept. Links interconnecting the ellipses (i.e. solid and broken lines with respective arrows) represent the relationships among the concepts. For example, the fact that a "supercomputer 1012" is "one variety of" a "computer 1011" is represented by a link labelled "IS-A". It should be mentioned that "UNIVERSAL 1010" is a specific concept defined to subsume all the other concepts. In other words, all the concepts constitute a concept tree having a root constituted by the concept "UNIVERSAL", wherein the concept tree represents a taxonomic hierarchy. The link "IS-A" is one variety of the relationships. However, this link also serves as a route for inheriting the property of a concept to the one ranked lower. Consequently, this link or relationship is considered discriminatively from the other relationships. To this end, the links "IS-A" are represented by the arrowed solid lines, while other links or relationships are represented by broken lines.

By way of example, in considering a generic property that "computer runs software", it will be noted that this property can also be represented by the expression "software runs on computer". This kind of relationship will herein be referred to as the generic relation. The representing format of the generic relation in the case of the example mentioned above is (COMPUTER RUNS SOFTWARE)

(SOFTWARE RUNS-ON COMPUTER) .... (5)

These generic relations can be taken over or inherited to the low rank concepts in such a manner that "supercomputer runs software" and "X-800 computer runs software" or "operating system runs on computer" and "UX runs on computer", where each of the foregoing is referred to as a generic relation. These relationships can be derived from the generic relation (5) and is not directly described in the knowledge base.

In FIG. 2, the link 1005 interconnecting the concepts "X-800" and "UX" differs from the aforementioned generic relationship. This link 1005 represents the individual relation defined between the two concepts linked together. This sort of relation will be referred to as the instance relation or simply as relation. It should however be noted that the relation 1005 is an instance relation of the generic relationship 1004.

In this way, the schematic diagram of FIG. 2 tells a fact that the subject matter of an article "ART #018" denoted by a numeral 1018 is the supercomputer X-800 and that an operating system UX runs on the supercomputer X-800. Further, it will be seen that all the concepts are interconnected by longitudinal lines referred to as the links labelled "IS-A" on one hand and interconnected by transverse links referred to as the generic relations and the instance relations, to thereby constitute the conceptual network.

In this conjunction, it is important to note that the property pertaining to a concept is not only considered from the standpoint of that concept but also equally considered in view of the concept that makes appearance in the definition of the property itself. This can be accomplished by adopting the idea "relation or relationship" defined between the two concepts and by giving a means to see the relation from both of these concepts. By way of example, assuming that the article "ART #018" whose subject is "X-800" is registered. Then, this means that the fact "X-800" is described in the article "ART #018" is also registered.

Figure 3:
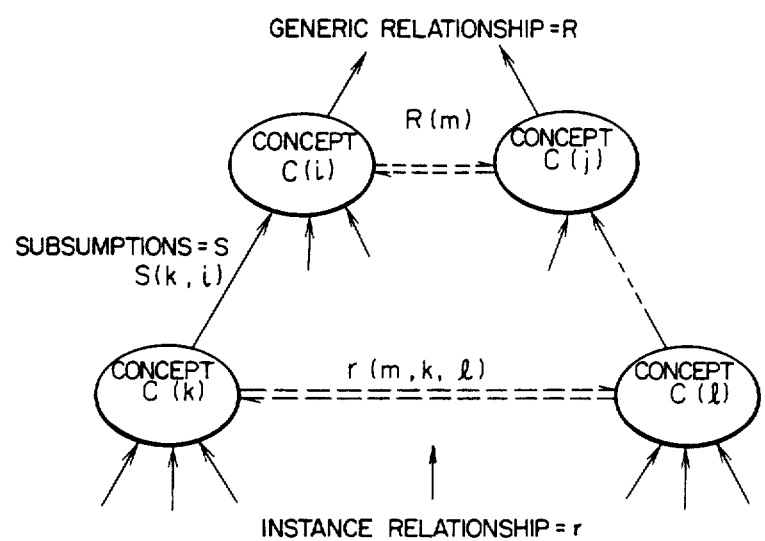
FIG. 3 is a view illustrating the concept network in a schematic diagram.

The knowledge representation elucidated above can be formally illustrated such as shown in FIG. 3. From the figure, it will be seen that the system stores four types of data in terms of the concept C, the subsumption relation S, the generic relationship R and the instance relation r for management. More specifically, C(i) represents the i-th concept, S(k, i) represents the fact that a concept C(K) is one variety of the concept C(i), R(m) represents the m-th generic relationship, and r (m, k, () represents an instance relation of the generic relationship R(m) which is defined between the concepts C(k) and C(l).

Figure 4:
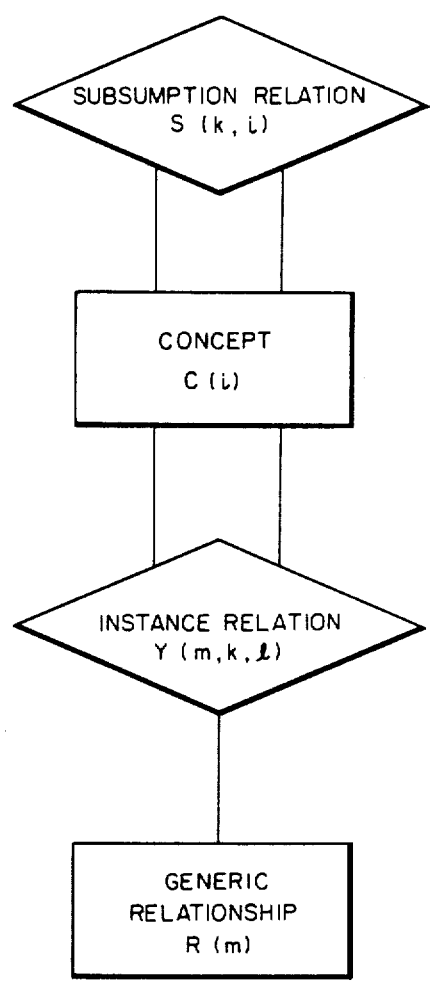
FIG. 4 is a view showing a concept relation model in an Entity-Relation diagram.

More particularly, these four types of data can be represented as an entity relation model in a tabular form, as will be seen in FIG. 4. Referring to the figure, the concept C and the generic relationship R are apprehended to be the entity while the subsumption relation S and the instance relation r are understood to be the relations interlinking the entities. The generic relationship defines a class of the instance relations r and is considered to be the entity. More concrete representations are shown in FIGS. 5 to 8 in the form of a table.

More specifically, FIG. 5 shows a table which lists definitions of words representing the concepts. Basically, the table is composed of a column containing identification numbers C# assigned individually to the concepts, a column containing concept names (words or notations) CNAME expressing the concepts, and a column containing indications as to whether the expressions are primary or secondary ones. For example, the concept identified by the number #58 is "computer" which is also expressed in Japanese.

FIG. 6 shows a table defining the subsumption relations. The table is composed of a column listing the individual concept identification number C# and a column containing the identification number each assigned to a higher rank or superclass concept subsuming the corresponding or associated concept C#. As a special case, the superclass concept of the concept "UNIVERSAL" is defined to be "UNIVERSAL".

FIG. 7 shows a table defining the generic relationships R. The table contains a column listing the numbers IS# identifying the generic relationships, a column listing the relationship names RSNAME of the generic relationships, a column listing readings LR which correspond to the readings of the generic relationships from left to right and a column listing readings RL which correspond to the readings of the generic relationships from right to left. In this conjunction, it is to be noted that "reading from left to right" applies validly only in the basic form in which two concepts interlinked by the associated generic relationship are juxtaposed side by side, the basic form being defined by the instance relation r which will be elucidated by referring to FIG. 8. By way of example, in the table R shown in FIG. 7, the name column RSNAME contains "SUBJECT" as the sixteenth generic relationship. This means that the "SUBJECT" is used as the instance relations:

IS-SUBJECT-OF or

SUBJECT-IS

It should further be added that there are such generic relationships for which the same readings are defined to have different meanings or usages. By way of example, there exist in the table of FIG. 7 the same two readings "HAS-PART-OF" which however apply to the different generic relationships named "PART-WHOLE 1" and "PART-WHOLE 2". This means that the part-whole relationship for the different concepts is to be handled discriminatively. Suppose for example in the relationship of "PART-WHOLE 1" is applied to the concept "organization" then, the relationship "PART-WHOLE 1" can be used, for example, in the form:

("ABC Co., Ltd." HAS-PART-OF "XYZ factory") (6)

On the other hand, when the relationship "PART-WHOLE 2" is applied to the concept "DISTRICT", the following relation, for example, exists.

("California state" HAS-PART-OF "LosAngeles") (7)

FIG. 8 shows a table containing the relations r defined between the concepts. In this table, both the generic relationships and the instance relations are entered. A column G/I serves to discriminate the generic relationship and the instance relation, wherein G indicates the generic relationship with I indicating the instance relation.

In the table r shown in FIG. 8, the records include the relation identifying number R#, the generic relationship identifying number RS# indicative of the type of the relationships, the left concept identification number CL identifying the concept located on the left side in the basic form, and the right concept identification number CR identifying the concept located on the righthand side in the basic form.

By way of example, the relation #4 is a generic relationship (G/I=G) which is defined by the concept #58 ("computer") and the concept #64 ("software") and which has meaning defined by the generic relationship #7. More specifically, in the table r, the following two relations in appearance (computer RUNS software)

(software RUNS-ON computer) (8)

are represented by the single record. Similarly, the relation #724 is an instance relation of the generic relationship #7 and interlinks the concepts #1512 and #1051 with each other. Namely, as will be seen in the table C, relations mentioned below are represented.

(X-800 RUNS UX)

(UX RUNS-ON X-800) (9)

The four kinds of data (tables C, S, R and r) described above are stored in the file 430 as the knowledge base.

Next, a table D for defining document images will be described with reference to FIG. 9. The table 9 includes columns for the document identification number D#, concept identification number C#, document size SIZE, compressing code type CODE, image scanning density DENS, physical address PHYSA on the optical disk and the number of recording sectors LENG. In the case of the record illustrated in FIG. 9, it will be seen that the document #98 concerns the concept #313 (i.e. article ART #018, see FIG. 5), the size is A4, the scanning is effected at the density of 16 lines/mm, the compressing code is the MH code, and the document is stored at 13 sectors following the address "400207" inclusive, of the optical disk.

As will be apparent, it is possible to combine all the concepts with respective document images. This means that the concept "COMPUTER", for example, may be accompanied with the illustrative image of a "DOCUMENT", if desired. Further, a single concept ay be annexed with a plurality of different documents.

The table D is stored for management in the file 420 shown in FIG. 1.

Figure 10:
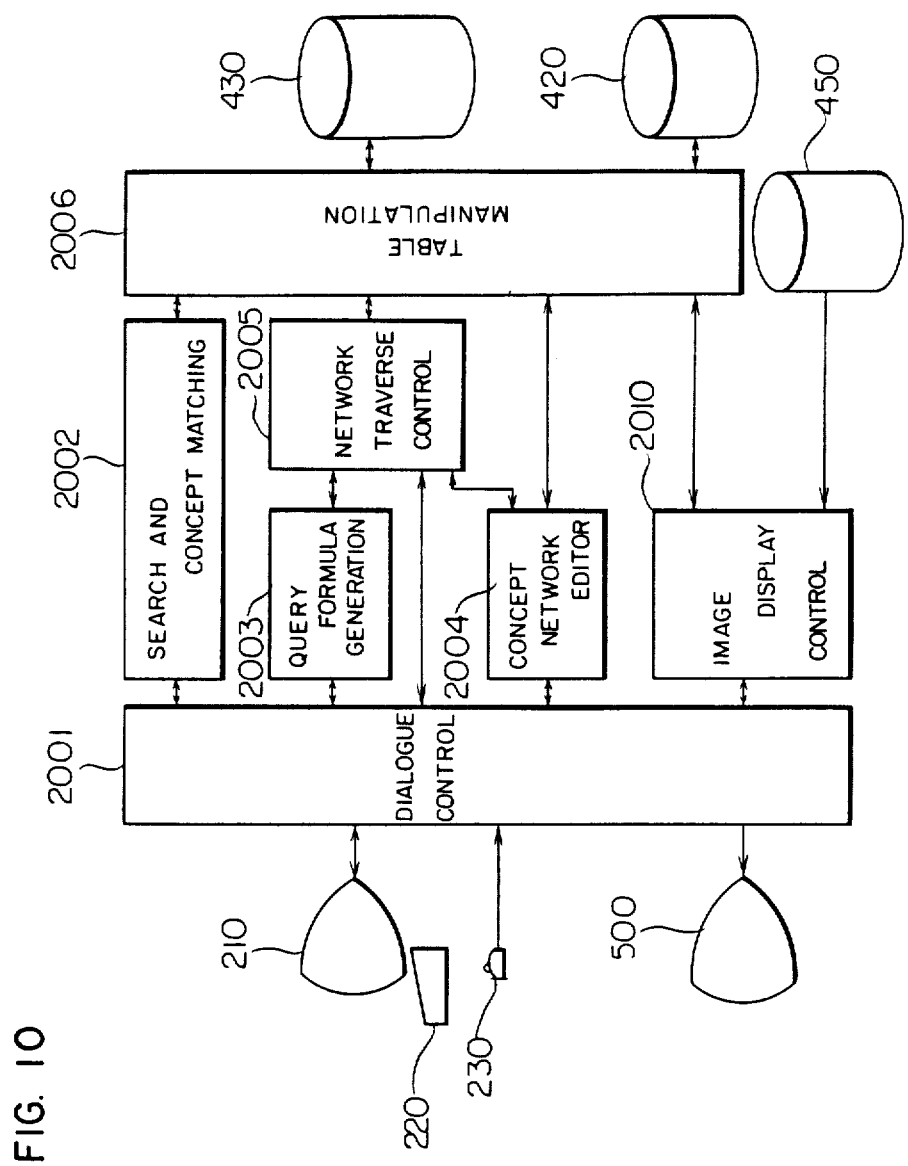
FIG. 10 is a functional block diagram showing software employed according to an embodiment of the invention.

In the foregoing, description has been made on the structure of the apparatus and the data representation formats embodying the invention. In the following, description will be directed to a software structure and processing procedures. FIG. 10 illustrates the software structure. In the first place, it should be mentioned that the illustrated software is processed by the control unit 100 (FIG. 1) and programs as required are stored in the file 410 (FIG. 1).

Referring to FIG. 10, the software includes a dialogue control module 2001, a search and concept matching module 2001, a query formula generation module 2003, a concept network editor 2004, a network traverse control module 2005, a table manipulation module 2006, and an image display control module 2010.

Description will first be made on the function of the table manipulation module 2006 which constitutes one of the basic components. The table manipulation module 2006 serves for manipulation of data of the aforementioned various table formated at a level of high order as well as retrieval of the data. Main functions of the module 2006 be enumerated below. Parenthetically, it should be mentioned that the program is written in LISP language and that S-expression is adopted. Further, for facilitation of the description, variables and functions are represented by small letters while constants are represented by capital letters.

As a function for creating a new table, "create-table" function can be mentioned. As to the table R shown in FIG. 7, for example, the framework thereof can be newly defined by calling the above function as follows:

```
(create-table 'R
    '(RS# RSNAME LR RL))                    (10)
``` wherein the first argument is the name of the table and the second argument represents the list (set) of the columns' names, while the quotation mark "1" means that the symbol following the mark is not a variable but a constant.

Next, an "insert" function for adding the records in the table will be mentioned. By way of example, in the table R shown in FIG. 7, three records 7, 15 and 16 can be added with the aid of the "insert" function as follows:

```
(insert 'R
    '(RS# RSNAME LR RL)
    '((7 RUN RUNS RUNS-ON)
      (15 DEVELOPMENT
          HAS-DEVELOPED IS-DEVELOPED-BY
      (16 SUBJECT
          IS-SUBJECT-OF SUBJECT-IS)))      (11)
```

For updating the record, a function "update" can be employed. Byway of example, in the table R (FIG. 7), the value of the record located in the column RSNAME where the value of the column RS# is can be updated to "THEME" by employing the function "update" as follows:

```
(update 'R
    'RSNAME
    'THEME
    '(eq (v RS#) 16))                      (12)
```

On the other hand, deletion of the record is performed as follows:

```
(delete 'R' (eq (v RS#) 16))               (13)
```

The second argument is a conditional term as is the case with the expression (12). Both the functions "update" and "delete" have arbitrary predicate functions.

For selection of the record (i.e. retrieval of the record), a function "select" is employed.

```
(select '(LR RL)
    'R
    '(smatch '*SUBJ (v RSNAME)))           (14)
```

According to the above expression (14), the record located at the column RSNAME of the table R which partially coincides with a fragmental or partial character string "*SUBJ" is selected. Thereafter, the values of the same record which are located at the columns LR and RL are returned to the list. In the above expression, "smatch" is a predicate function employed for deciding whether the record matching with the fragmental or partial character string exists or not.

The main functions of the table manipulation module 2006 have been described. Next, the network traverse control module will be described together with methods of implementing main functions.

As described hereinbefore in conjunction with FIG. 2, the conceptual network is composed of the concept nodes and links termed "relation". The system remembers as a current node the concept constituting the key of the subject which the user is interested in. The user in turn is capable of browsing (traversing) in the network by employing the functions mentioned below. In this connection, it should be mentioned that "browsing or traversing" is equivalent to the displacement or movement of the current node.

Now, main network traverse or browse functions will be considered. As a procedure for moving the current node, the name of the concept or a partial character string thereof may be first entered. When it is found at this step that a plurality of concepts which coincides with the partial character string are present, a menu table is displayed so that the user can select one of the displayed concepts, the result of which is transferred to the current node. FIG. 11 shows a display of the menu of concepts which coincides with the partical character string "*DATABASE", wherein the seventh concept in the menu has been selected. The mark "*" indicates that a string of characters following the mark is the partial (incomplete) character string. The above function can be realized by selecting the concept in accordance with

```
(select '(C# CNAME)
    'C
    '(smatch str (v CNAME)))               (15)
``` and calling separately the menu selecting function (select-one a-list). In the above expression, "str" is a variable for the character string entered at the terminal.

A second browse or traverse procedure is to sequentially trace or follow the conceptual tree (hierarchical tree) by resorting to the menu selection. FIG. 12 shows a menu of concepts ranking immediately below the uppermost concept UNIVERSAL with command "l". Starting from the menu shown in FIG. 12, the hierarchical tree can be followed downwardly by inputting the desired concept numbers in the menus in a manner illustrated in FIG. 13. More specifically, in the case of the example shown in FIG. 13, the concept "organization" has been reached by inputting the numbers "6", "1", "1" and "2" in this order. At this point, if the partial or incomplete character string is inputted, the concept matching with the partial character string is carried out only for the set of concepts subsumed by the current node (i.e. in this exemplary case "organization"). By way of example, among the eleven concepts shown in FIG. 11, only the eleventh concept (name of company) "RELATIONAL-DATABASE-SYSTEM-INC" would be selected. In other words, only this concept is subsumed by the concept "organization".

The concept subsumed by a given concept C can be derived in a manner mentioned below. First, in accordance with

```
(C#'C#)'S'(eq (v S#) C))                   (16)
``` the concept directly subsumed by the given concept (i.e. the concept directly underlying the given concept in the hierarchical tree) is selected. Accordingly, by calling recursively the same function, all the concepts subsumed by the given concept C can be selected.

Figure 14:
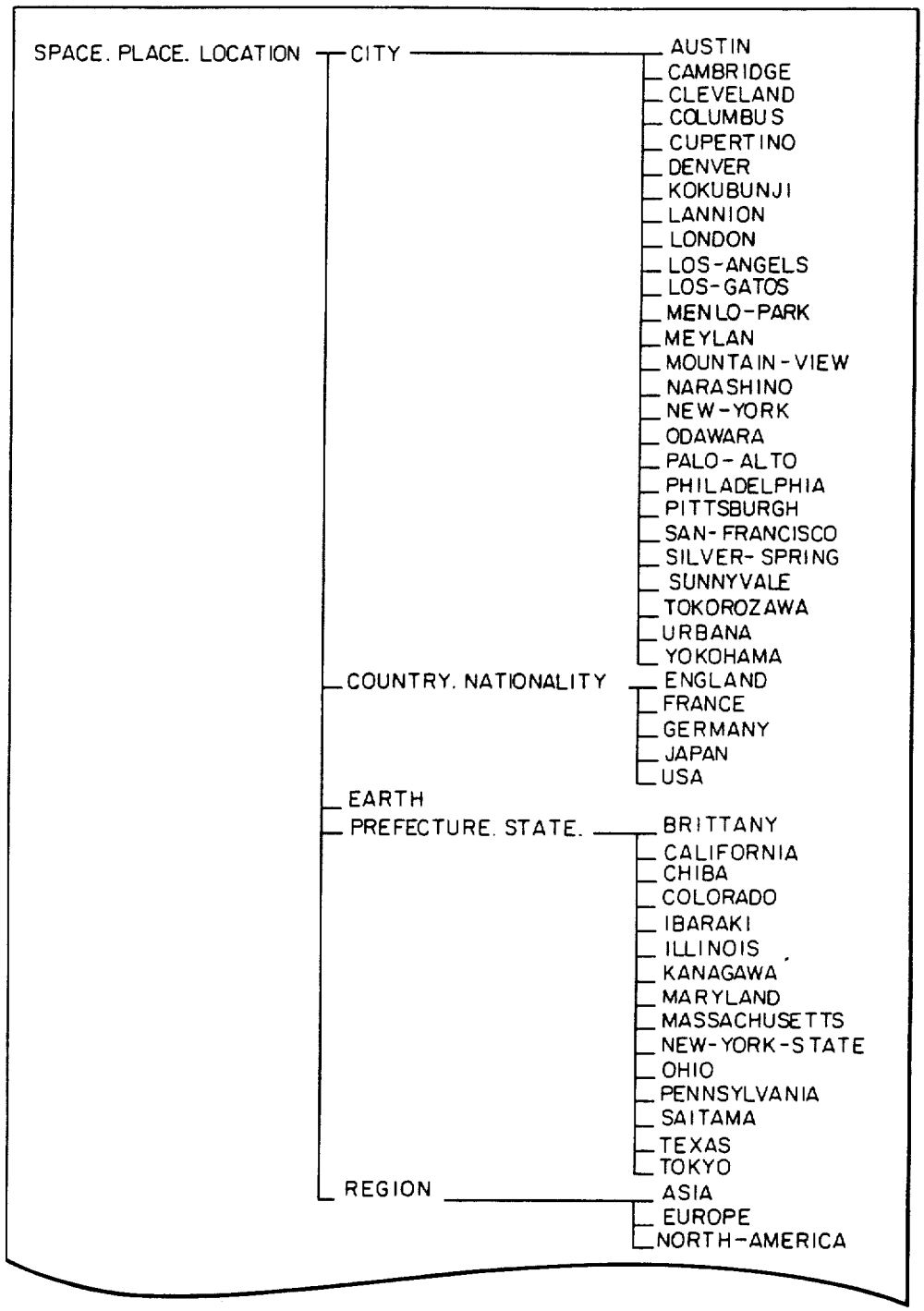
FIG. 14 is a view showing a concept tree display.

A third browse procedure can be carried out by displaying graphically the conceptual or hierarchical tree on the CRT. FIG. 14 shows a concept tree beginning with a concept "space" down to the second hierarchy. By designating a given node of the concept tree displayed on the CRT 210 by means of the mouse 230 shown in FIG. 10, the current node can be moved to the designated node or the portion of the concept tree immediately underlying the designated concept can be displayed. It should be pointed out that information of the position or location on the CRT 210 designated by the mouse 230 is received by the dialogue control module 2001. Since this module is destined to control the graphic display, the module can memorize what is displayed at which locations on the CRT. Accordingly, in response to the input information of a location, the control module 2001 can identify the concept being displayed at that location on the CRT at the most recent time point. Consequently, the dialogue control module 2001 inputs information of the cursor position and returns the concept name to the network traverse module 2005.

Figure 15:
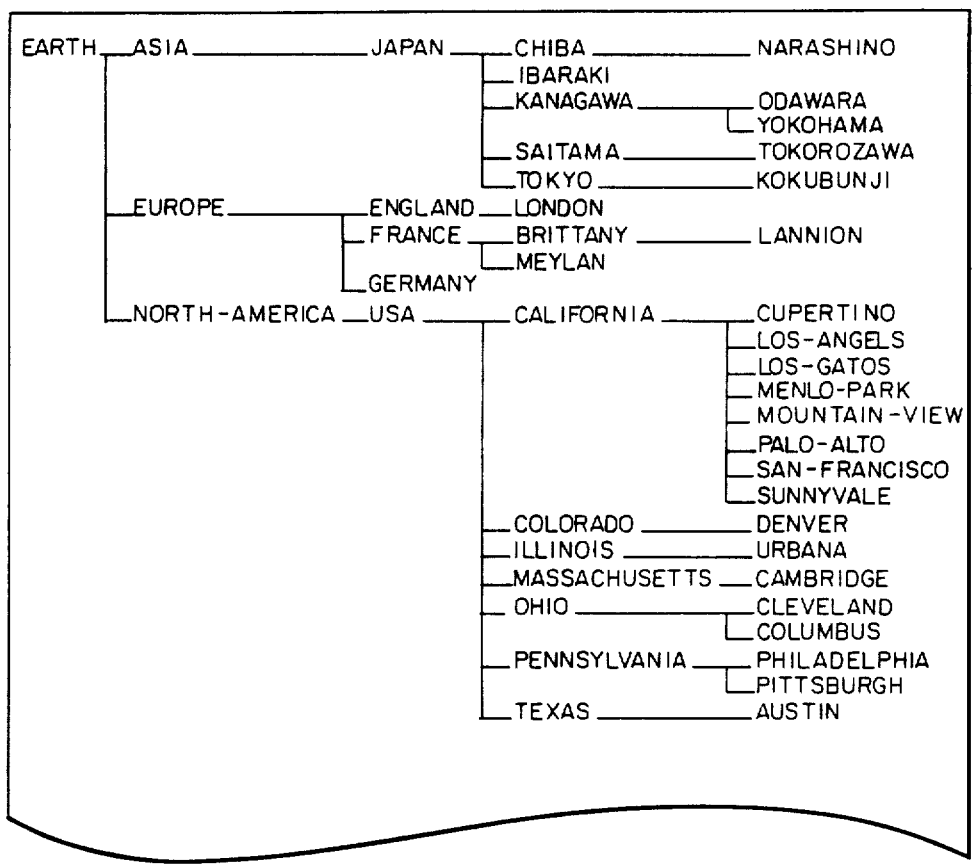
FIG. 15 is a view showing a hierarcal tree based on the part-whole relationship.

The graphical browse or traverse function can be realized not only by making use of the subsumption relations of the concepts illustrated in FIG. 14 but also by resorting to the part-whole relation. FIG. 15 shows a part of hierarchies of the concept "earth" in another conceptual tree configuration. The tree can be browsed, being directed by the part-whole relation in the utterly same manner as the case described above in conjunction with FIG. 14. The "part" concept can be extracted in the manner mentioned below. First, in accordance with $$\begin{array}{ll} \text{(select '(RS\#)} \\ \quad \text{'R} \\ \quad \text{'(eq (v LR) 'HAS-PART-OF))} & (17) \end{array}$$

a set of the generic relationship identification numbers RS# representing the part-whole relations are called from the table R shown in FIG. 7. In the case of the example illustrated in FIG. 7, "2223" is called and memorized temporarily at a variable x.

Assuming now that the concept which has as a part thereof a concept to be found out, is represented by C, the concept constituting the part of C is derived in accordance with $$\begin{array}{ll} \text{(select '(CR)} \\ \quad \text{'r} \\ \quad \text{'(and (eq (v CL) C)} \\ \quad \quad \text{(member (v RS\#)x)))} & (18) \end{array}$$

where a small letter r is the name of the table shown in FIG. 8.

In the case where "HAS-PART-OF" is located at the column RL of the table R shown in FIG. 7, the concept constituting a part of the concept C can be obtained by implementing the expressions (17) and (18) with LR being exchanged by "RL" in the similar manner.

A fourth browse procedure resides in a chain-like traverse with the aid of frame representation. This procedure will be described in detail in conjunction with an example shown in FIG. 16. At first, a partial character string "*sowa" representative of a part of a man's name is inputted. Then, only "J. F. SOWA" is found out. The current node is moved automatically to this concept. The frame for this concept is displayed by a command fr for the frame display (the operand "*" means that the frame for the current node be displayed). From the frame displayed, it is found that "J. F. SOWA" is male "MAN" and that he is the author of "PAPER #0012" and "BOOK #0007". In this conjunction, when it is desired to know what is dealt with "PAPER #0012", a command "fr 2" is inputted, resulting in that a frame for the second row of the frame being displayed is subsequently displayed. In the case of the example under consideration, the subsequent display tells that "PAPER #0012" is "TECHNICAL PAPER" written by "J. F. SOWA" and contained in "IBM-RES & DEV-76-20" on pages 336 to 357. In the case of the example, the current node is moved from "J. F. SOWA" to "PAPER #0012" and hence to "IBM-RES & DEV-76-20" and finally to "IBM-CORP".

The frame display is performed in the manner described above. Assuming now that the frame for the concept C is to be displayed in accordance with $$\begin{array}{ll} \text{(select '(RS\#CR)} \\ \quad \text{'r} \\ \quad \text{'(eq (v CL) C))} & (19) \end{array}$$

there can be obtained a set of pairs of a relation under the concept where C is located on the lefthand side in the basic form and the concepts which are located on the right hand side. Similarly, from $$\begin{array}{ll} \text{(select '(RS\#CL)} \\ \quad \text{'r} \\ \quad \text{'(eq (v CR) C))} & (20) \end{array}$$

there can be obtained a set of pairs of a relation under the concept in which C is located on the righthand side.

Assuming that said x is y are the results of procedures mentioned above, respectively, $$\begin{array}{ll} \text{(select '(LR)} \\ \quad \text{'R} \\ \quad \text{'(eq (v RS\#) } x_{li})) & (21) \\ \text{(select '(RL)} \\ \quad \text{'R} \\ \quad \text{'(eq (v RS\#) } y_{li})) & (22) \end{array}$$

return the names of instance relations, where $x_i$ and $y_i$ represent the i-th members of the set x and y, respectively, and $x_{1i}$ represents the first element of the member $x_i$ and $y_{1i}$ represents the first element of the member $y_i$. The names of these instance relations correspond to a first column of the frame (FIG. 16). More specifically, when the individual rows of the frame are termed as slots, the names under consideration correspond to the names of the slots, respectively. The second column of the frame contains the slot values representing the second elements $x_{2i}$ and $y_{2i}$ of the pairs $x_i$ and $y_i$, respectively. Accordingly, by combining the slot names and the slot values in pairs and displaying then in a tabular form, a display such as shown in FIG. 16 can be produced. Since the concept is internally coded in terms of the concept identification number, transformation of the concept number to the concept name must be carried out by consulting the table C (FIG. 5) before generation of the display.

In the case of the example mentioned above, shift a is made to a succeeding frame by designating the row number (slot number). However, it is also possible to indicate directly the concept to which shift is to be made on the CRT by means of the mouse. Further, the frames can be displayed in sequential superposition.

Next, the concept network editor 2004 shown in FIG. 10 will be considered.

The concept network editor serves for maintenance of the knowledge base by performing definition and addition of novel concepts and/or relations, alteration and deletion thereof.

FIG. 17 illustrates an example of dialogue or interaction. First "man" is entered through the keyboard, resulting in that the current node is moved to the concept "MAN", which is followed by registration of a new man "SUPERMAN". Through a command "crc", "MR. SUPERMAN" can be registered at a run below "MAN". Namely, (MR. SUPERMAN IS-A MAN)     (23)

is registered.

Subsequently, the property of the newly registered concept "MR. SUPERMAN" is defined and registered in the form of the instance relation.

The system possesses knowledges in the generic form such that "a man devises a novel thing", "a man has an academic title" or "a man has a job of some sort". By taking advantage of these knowledge as prompt, the system can display the item to be inputted. By way of example, inputting of "MR. SUPERMAN" can be prompted in the form:

MR. SUPERMAN HAS-TITLE-OF
    {ACADEMIC TITLE}

The parenthesized concept "ACADEMIC TITLE" indicates the class of property (a concept in the case of this example) to be inputted. The concept network traverse function is valid at this time point. The current node has been moved to the concept "ACADEMIC-TITLE" at that time point. Consequently, a given traverse function can be employed in order to find out the property to be inputted. In the case of the example shown in FIG. 17, the concept name "phd" is directly inputted. However, it is also possible to display the concepts of the rank lower than the concept "ACADEMIC-TITLE" in the form of a menu (see FIG. 13) or display the conceptual tree (FIG. 14) for searching the desired concept. It should however be noted that the searching and browsing are restricted to the range of the lower rank concepts of "ACADEMIC TITLE". After the current node has been moved to the concept expressing the property to be inputted through the traverse function, "OK" is inputted for preparation for the inputting of succeeding property.

As will be appreciated from the above, only the properties to be inputted can be selected to be newly defined and registered in accordance with the prompts displayed by the system.

As described hereinbefore, one of the characteristic features of the invention resides in that the property is understood in terms of the instance relation to thereby allow both concepts to be equally dealt with. Accordingly, in the case of the example illustrated in FIG. 17, the facts (PHD IS-GIVEN-TO MR. SUPERMAN)

(AAAI HAS-MEMBER-OF MR. SUPERMAN)

(JAPAN HAS-PEOPLE-OF MR. SUPERMAN)

(HITACHI-LTD HAS-EMPLOYEE-OF MR. SUPERMAN)

can be defined simultaneously.

New registration of a concept can be internally realized in a manner mentioned below. Assuming now that the maximum C# (FIG. 5) is represented b $C_{max}$, the concept "MR. SUPERMAN" can be entered in the table C in accordance with (insert 'C
      '(C# CNAME P/S)
      (list (addl $C_{max}$)
      'MR. SUPERMAN
      'P))     (24)

where the function "add 1" serves for incrementing by one (+1). In accordance with (insert 'S
      '(C# S#)
      (list (addl $C_{max}$)
        (get-c# 'M A N)))     (25)

the fact expressed by the formula (24) can be entered in the table S. The function "get-C" serves for deriving from the concept name the identification number of that concept.

Registration of the instance relation can be performed relative to the name relation (property) in the manner mentioned below.

(insert 'r
      '(R# RS# CL CR G/I)
      (list (addl r#max)
      rs
      (get-c# 'MR. SUPERMAN)
      (get-c# 'PHD)
      'I))     (26)

where "rs" is the identification number of the generic relationship "ACADEMIC-TITLE", and "r#max" represents the maximum R# in the table r at that time point.

Another function of the concept network editor is alteration and/or modification (correction) of the facts and concepts which have already been registered. More specifically, modification or correction of the name of concept, modification (correction) of positions in the conceptual tree (modification of classification), modification (correction) of the instance relation and generic relationship can be performed.

Figure 18:
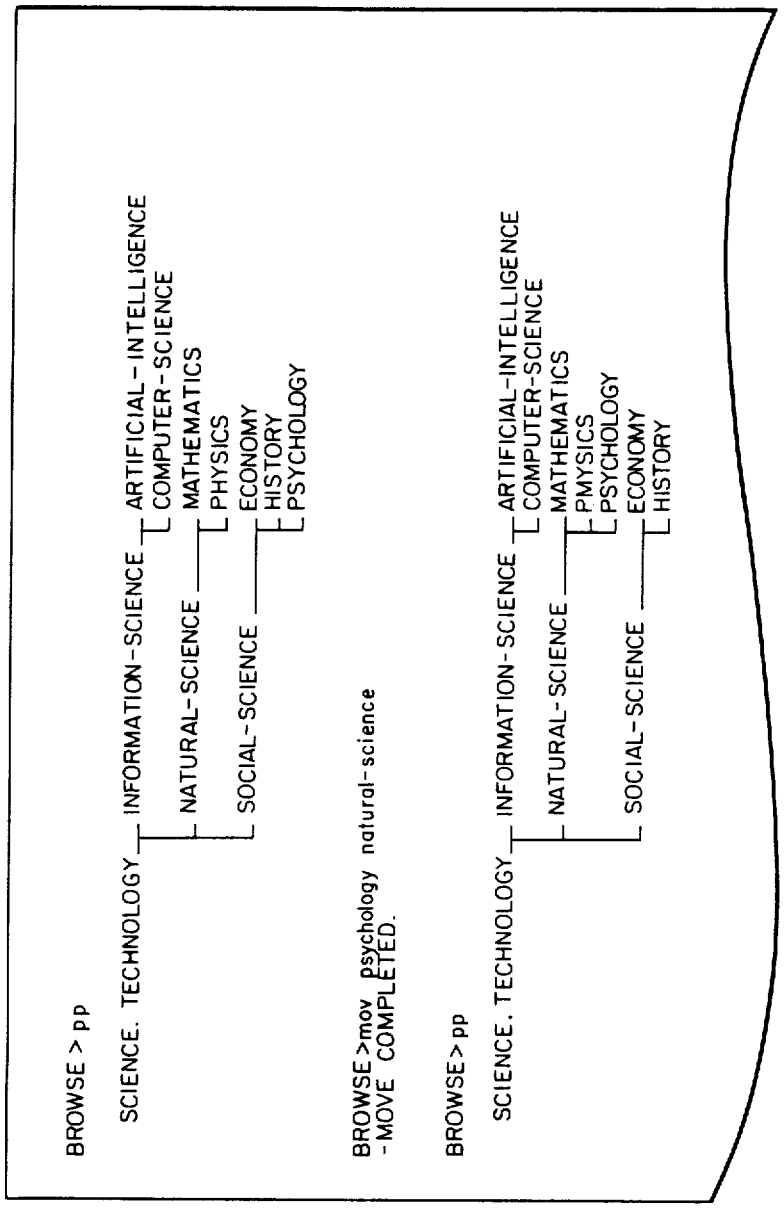
FIG. 18 is a view for illustrating concept network edition.

FIG. 18 shows an example of modification of the conceptual tree in which the position of a concept "PSYCHOLOGY" is to be changed from a class "SOCIAL-SCIENCE" to a class "NATURAL-SCIENCE". This change can be realized in accordance with

```
(update 'S
  'S#
  '(get-c# 'NATURAL-SCIENCE)
  '(eq (v C#)
    (get-c# 'PSYCHOLOGY)))                    (27)
```

As described hereinbefore, in the concept network editor, the network browsing function can be employed as desired. Similarly, the network editor function itself can be recursively employed. In reality there often arises such situation in which another concept is required to be newly entered in the course of registration of the definition of a new concept. In the case of the example illustrated in FIG. 17, when a concept "AAAI" to be inputted has not yet been entered in the class "ACADEMIC-ASSOCIATION", the instruction or command "crc" is newly inputted at this time point to thereby allow the concept "AAAI" to be entered. Furthermore, the property of "AAAI" may be registered at that time point under the instruction "crr", if desired.

Moreover, there also arises such situation in which in the course of registration of a new concept, registration of false "fact" is found. In that case, the function of modification and/or alteration can be executed without delay. Due to such recursiveness, new knowledge can be additionally entered with improved efficiency.

Next, description will be made of the query formula generation module 2003 and the search and concept matching module 2002 shown in FIG. 10. These modules constitute a major portion for making possible semantic content retrieval from fragmentary ambiguous information. Before entering into description of the function, a processing flow will be considered in conjunction with an exemplary retrieval. It is assumed that "article concerning a computer developed by a company residing in Calfornia state which computer runs under UNIX" (28). CUNIX is a registered trade mark of Bell Laboratory.

Referring to FIG. 10, the current node is moved to the concept "ARTICLE" and an instruction q is inputted to start the generation of search (retrieval) formula. The system determines the generic relationships defined for the concept "ARTICLE" inclusive of those inherited from the superclass concept to display them in the frame format, as shown in FIG. 19. More specifically, the frame containing the generic knowledge of ARTICLE IS-PART-OF PUBLISHED MATERIAL", "ARTICLE is -IN-PAGES-OF SO-AND-SO", "ARTICLE IS-REFERRED-TO-FROM ARTICLE" and others is displayed. Then, the user can add more concrete information than the one being currently displayed, by designating a corresponding slot with the identification number assigned thereto. In the case of the example illustrated in FIG. 19, the fifth slot is selected because the information that the subject of the article is a computer is known to the user. In response thereto, the system moves the current node to the superclass concept (i.e. concept of higher rank) of the item to be entered. In this case, the current node is moved to the concept "UNIVERSAL". At this time, the user may use the any given network traverse function (refer to FIG. 10). In the case of the example illustrated in FIG. 19, "computer" is directly inputted to thereby move the current node to the concept "COMPUTER". However, unless the user can recall the name of the concept to be inputted (in this case, computer), it can be determined by inputting the incomplete character string displaying the menu. In the case of the example under consideration, since further information of the computer exists, the instruction q is successively inputted in succession to the inputting of "computer".

FIG. 20 shows a display content for the dialogue or interaction. It will be seen that the generic relationships concerning the concept "COMPUTER" are displayed in a frame structure. Similarly to the preceding procedure, the slot for the condition to be added (the fourth slot in this case) is selected. Then, it is displayed that the class of item to be inputted is "ORGANIZATION WORKPLACE". At this step, the selection from menu (refer to FIG. 13) can be employed. In the case of the present example however, "company" meaning "a certain company" is solely inputted straightforwardly. Since there exists information to be added for "company", the instruction q is succeedingly inputted to continue the process of generating the retrieval formula.

FIG. 21 illustrates a frame display of the generic relationships for the concept "COMPANY". By selecting the seventh slot, the condition that the company under search is located in California. It should be noted that "CALIFORNIA" is selected by inputting the incomplete character string "CAL". The concepts ranked lower than the concepts "SPACE", "PLACE" and "LOCATION" are shown in FIG. 14.

Completion of inputting the conditions is informed to the system by inputting "ok". FIG. 22 illustrates a case where conditions are again inputted in connection with the concept "COMPUTER" upon completion of inputting the conditions for "COMPANY". At this time, the thirteenth slot is selected to thereby input the information that "the same computer runs under the operating system UNIX".

When the procedures described above have been completed, the retrieval condition given by the expression (28) is replaced by the following formal expression:

```
(ARTICLE
  (SUBJECT-IS
    (COMPUTER
      (RUNS-UNDER UNIX)
      (IS-DEVELOPED-AT
        (COMPANY
          (IS-LOCATED-IN CALIFORNIA))))))    (29)
```

As will be seen from the above, automatic generation of the retrieval formula is performed under the guidance of the generic knowledges described in terms of the generic relationships. Most of the generic knowledges are inherited from the concept of upper rank. By way of example, referring to FIG. 21, although "COMPANY is-A ORGANIZATION.WORKPLACE", most of the slots (generic relationships) in that frame are defined for the upper concept "ORGANIZATION.-WORKPLACE", the slot inherent to the concept "COMPANY" is only the slot "PRODUCES MACHINERY. DEVICES". In this way, when the generic relationships representing the generic knowledges are expressed literally more generically (i.e. with higher rank concepts), the generic relationships can have greater significance. In other words, they can be applied to a greater number of the concepts of lower rank.

The generic relationship of a concept C can be determined in the manner mentioned below. It is now assumed that a set of the concepts ranking higher than the concept C is represented by x. (The set can be determined by following the link "IS-A" in the table S up to the concept "UNIVERSAL".) In accordance with

```
(select '(RS# CR)
    'r
    '(and (member (v CL) x)
        (eq (v G/I) 'G)))                    (30)
``` the generic relationship in which the concept C is defined on the lefthand side is extracted from those inherited to the concept C. It will be understood that the generic relationship in which the concept C is defined on the righthand side can be obtained by replacing CL by CR in the expression (30). As will be seen from the above expression (30), what is obtained is a pair of RS# and CL or CR. From RS#, the slot name of the frame can be determined by consulting the table R. Assuming the answer of the expression $$\{(y_{11}, y_{21}) \ldots (y_{1i}, y_{2i}) \ldots\},$$

```
(select '(LR)
    'R
    '(eq (v RS#) y_{li}))                    (31)
```

Accordingly, the slot name corresponding to the i-th y can be obtained. When C1 is replaced by CR in the expression (30), then LR is replaced by RL in the expression (31) (refer to FIG. 7).

When the answer of the expression (31) is written as $\{(z_1) \ldots (z_i) \ldots\}$, the pair $(z_i, y_{2i})$ consists of the slot name and the concept identification number. In accordance with

```
(select '(CNAME)
    'C
    '(and (eq (v C#) y_{2i})
        (eq (v P/S) 'P)))                    (32)
``` the concept name $C_i$ is derived, resulting in that the pairs $(Z_i, C_i)$ represents the slot name and the slot value. By displaying the list $\{(Z_1 C_1) (Z_2 C_2) \ldots (Z_i C_i) \ldots\}$ in the tabular form, the frame of the generic relationships can be obtained, as illustrated in FIG. 21.

When the search instruction is inputted for the automatically generated retrieval condition formula (e.g. expression 29), concept matching is performed relative to the set of terminal concepts of the current node (i.e. the concepts corresponding to the leaves of a concept subtree). More specifically, each of the terminal concepts (the most concrete concepts) in compared with "abstract concept" expressed by the retrieval condition formula, resulting in the terminal concept subsumed by the abstract concept.

Figure 23:
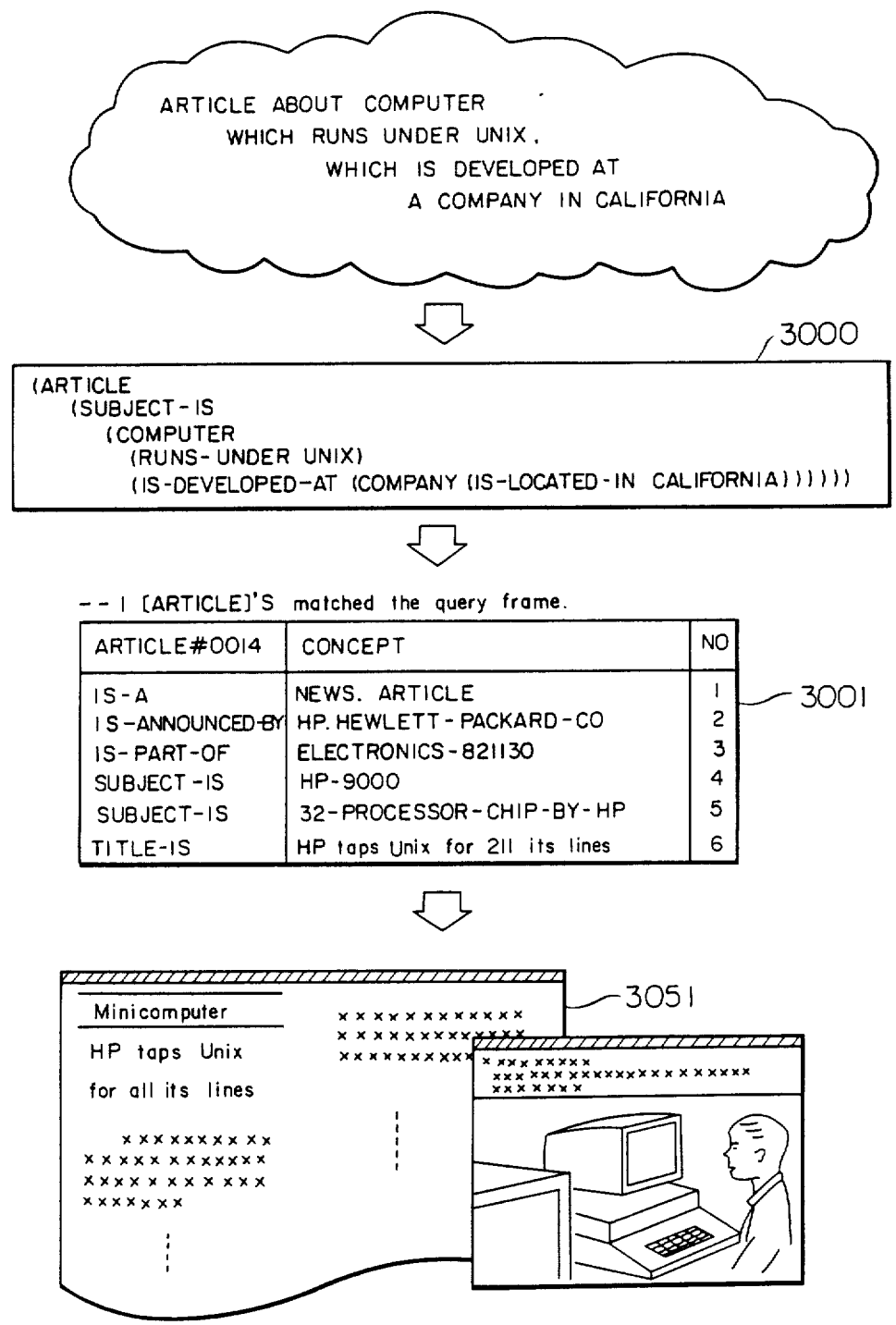
FIG. 23 is a view for illustrating semantic retrieval.

FIG. 23 shows the search in accordance with the retrieval condition 3000 given by the expression (29). It is possible to produce the frame display 3001 of the concepts of an article meeting the condition and the display of a document image 3051. It should be noted that the concept frame of the symbol "ARTICLE #0014" does not coincide with the retrieval condition (29) at all in appearance. Such situation will occur in the information retrieval for the hitherto known data base. More specifically, since the most concrete information is stored in the hitherto known data base, there takes place no coincidence at all when the retrieval condition is abstract. In contrast, according to the teachings of the present invention, the gap between the concrete contents of the concept frame and the abstract expression of the retrieval condition is eliminated by inference based on the world knowledges.

Next, description will be made of a matching method in which inference is resorted to for eliminating a possible gap existing between the abstract concept and the concrete concept. This method or procedure is referred to as the concept matching. FIG. 24 illustrates a process of the concept matching between an abstract concept given by the expression (29) and the concept "ARTICLE #0014".

In the searching process, the terminal concepts "ARTICLE #0001", ..., "ARTICLE #0040" are, respectively, compared with the condition (29). However, for simplification of description, only the terminal concept "ARTICLE #0014" which succeeds in the matching will be considered.

First, (ARTICLE) and (ARTICLE #0014) are compared with each other. From the frame 3001, (ARTICLE #0014 IS-A NEWS.ARTICLE)

and further (NEWS.ARTICLE IS-A ARTICLE)

Accordingly, (ARTICLE #0014 IS-A ARTICLE)

By narrowing the condition by one step, it is checked whether (ARTICLE (SUBJECT-IS COMPUTER ))          (33)

is valid or not. From the frame 3001, it is seen that

```
(ARTICLE # 0014
    (SUBJECT-IS HP-9000))
```

Accordingly, check may be made as to whether or not (HP-9000 IS-A COMPUTER)

By following up the link 3003, (HP-9000 IS-A SUPER-MINICOMPUTER)

Further, when the link 3032 is followed up, (SUPERMINICOMPUTER IS-A COMPUTER)

The above are apparent from the frames 3002 and 3004, respectively. Thus, the formula (33) applies valid. Accordingly, check is next made as to the validness of

```
(ARTICLE
    (SUBJECT-IS
        (COMPUTER    (RUNS-UNDER UNIX)
                     (IS-DEVELOPED-AT
                         COMPANY))))       (34)
```

It can be seen directly from the frame 3002 that (COMPUTER RUNS-UNDER UNIX) applies valid. Concerning (COMPUTER IS-DEVELOPED-AT COMPANY), the frame 3002 states (HP-9000 IS-DEVELOPED-AT
HP.HEWLETT-PACKARD-CO)

Following the link 3033, it is stated in the frame 3004 that (HP.HEWLETT-PACKARD-CO IS-A
COMPANY)

Accordingly, statement in the frame 3002 is true, which means that the expression (34) applies valid.

Further narrowing the retrieval condition by one more step, comparison with the condition (29) is made. Since the frame 3004 states (HP.HEWLETT-PACKARD-CO
IS-LOCATED-IN PALO-ALTO)    (35)

it is necessary to check whether or not (COMPANY IS-LOCATED-IN CALIFORNIA)    (36)

Following the link 3034, the frame 3005 states:

(PALO-ALTO IS-PART-OF CALIFORNIA)    (37)

Accordingly, in combination with the expression (35), it is inferred that (HP.HEWLETT-PACKARD-CO
IS-LOCATED-IN CALIFORNIA)

Thus, it is found that the abstract concept (29) subsumes the concrete concept "ARTICLE #0014".

In the foregoing, the concept matching has been elucidated in connection with a concrete example. Briefly the process for checking the presence of the subsumption relation between concepts and the process for checking the coincidence between the individual slots are alternately and recursively called for proceeding with the procedure. Further, the procedure adopts the backward-changing inference. Accordingly, the time taken for the searching is basically proportional to the number of the concrete items subjected to search.

In the concept matching, the concrete concept is returned as a value then the matching is successful. By inserting this value in the abstract concept, it becomes apparent ultimately why a certain concrete concept has matched. According to the invention, an instruction "why" is inputted, as the result of which the reason why the matching was found is displayed and outputted. In the case of the example given by the expression (29), there is outputted (ARTICLE # 0014
(SUBJECT-IS
(HP-9000
(RUNS-UNDER UNIX)
(IS-DEVELOPED-AT
(HP.HEWLETT-PACKARD-CO
(IS-LOCATED-IN PALO-ALTO))))))    (38)

Thus, it is found that the computer stated abstractly in the course of retrieval is "HP-9000" and that a certain company is "HP.HEWLETT-PACKARD-CO".

The present invention also provides means for translating the knowledge expressed by the concept network into tabular form familiar for the user and allowing the retrieval on the table. An example of such means is illustrated in FIG. 25. After the current node has been moved to an abstract concept "NEWS.ARTICLE", an instruction "tab" is inputted. Then, the system generates internally a concept frame of the terminal concept of the abstract concept. Subsequently, the slot names appearing in the concept frame are presented in the form of a table. In the case of the example illustrated in FIG. 25, it is assumed that six varieties of slots are present. The user can select the slots which is to be transformed to columns of the table. In the case of the illustrated example, the sixth and fifth slots, i.e. "TITLE-IS" and "SUBJECT-IS" are selected, whereby a table including three columns in total is prepared. The user may search out the desired item on the basis of sentences contained in the column "TITLE-IS". The selected result is set as the current node and an instruction for displaying the document image is inputted. Then, the document image is displayed on the CRT 500.

The retrieval system according to the present invention can be applied not only to the document filing but also to more general purpose such as retrieval of data in general and information of facts or actual things. Further, the concept matching which is capable of automatically determining the subsumption relation between two concepts is also applicable as an information analyzing technique for examining whether the subsumption relation exists between claims of patents. Moreover, cluster analysis of concepts is possible by collecting an enourmous amount of concrete concepts and applying the inventive concept matching. In the foregoing description of the preferred embodiments of the invention, it has been assumed that the system is destined for handling knowledges and documents written in English. However, the invention may be readily so embodied that knowledges and documents stated in other languages can be equally processed without departing from the spirit and scope of the invention. Those portions which depend on the language are limited to the column "CNAME" of the table C shown in FIG. 5 and the columns "RSNAME", "LR" and "RL" of the table R shown in FIG. 7. Additionally, the system can be so extended that multiple languages can be concurrently handled. To this end, a column "LANG" is additionally prepared for the table D and J may be recorded in this column when the concerned language is Japanese and E may be recorded when the language is English.

Although the concept registering function is based on the system initiative interaction in which all the slot names are sequentially presented to the user, as illustrated in FIG. 17, it is possible to embody the invention in the user initiative system in which the generic frame such as shown in FIG. 19 is displayed to allow the user to input desired properties at his or her will. The type of interaction is identical with the one adopted in the retrieval formula generation and thus encompassed by the invention.

As a development of the invention, the concept of time can be introduced into the knowledge base. Usually, there takes place frequently such situations in which the time at or for which a fact is "true" is required to be designated. By way of example, a fact "MR. SUPERMAN IS-MEMBER-OF AAAI" is true from the time when SUPERMAN joined AAAI to the time when he secedes therefrom. Such time concept can be realized by correspondingly extending the table r containing the instance relations.

Another extension of the system can be realized in respect to the function for recording the sources of the individual facts. By way of example, the sources of information such as "who said so", "where it is written" and so forth can be recorded in the table r by correspondingly extending it. Further, an extent of reliability may be added.

The present invention is independent of the configuration in which the system is realized. In order to accomplish a high-speed processing, specific hardware may be introduced. Further, when the knowledge base becomes excessively large, variation in implementation such as division of the tables for storing the concepts and relations each into clusters can be made within the coverage of the present invention. When the concepts and others are to be expressed in Japanese, kana (Japanese alphabet)—Chinese character translating function is required. The system incorporating this function is also covered by the present invention.

As will now be appreciated from the foregoing description, it is possible according to the present invention to derive easily any desired information such as that of a document starting from fragmentary information without necessity to know the actual architecture of the file or data base. Further, storage of information in such manner that information may be easily read out can be realized without any appreciable difficulty.

In particular, the world knowledge about the subjects to be filed are expresed in terms of the concept network for realizing the knowledge base, whereby addition of fresh knowledge, edition and dialogical inputting of retrieval conditions can be performed in a much facilitated manner. Although the knowledge is expressed in the forms of generic relationship and instance relation, the system is imparted with the capability of inferring and displaying, upon inputting of information, what is next to be inputted by the user and to what class the concept should belong on the basis of the generic relationship. This capability or function is architected on the basic principle. Application to new worlds and/or more delicate worlds is possible merely by addition or alteration of the knowledge base expressed by the concept network.

The system includes the concept network editor for allowing addition and/or alteration of the knowledge base. The editor is imparted with the function to display the status of the knowledge base having four or more network browsing functions in the form of the concept tree, menu table, frame, or relation data base table. In conjunction with such display, it is also possible to browse from one to another different concepts in a sequential manner. The possibility of such abundant data viewing is due to adoption of the newly devised concept relation model. In particular, the function of browsing to different concepts while displaying the conceptual frame is compatible way man's thinking faculty or process. Accordingly, with this function alone, the highly intelligent concept searching can be accomplished.

Further, owing to the inference based on the world knowledge, meaningful content retrieval can be accomplished starting from the fragmentary vague information. Even from the abstract information which is useless for the hitherto known system, semantically meaningful contents can be derived, ensuring the retrieval with high accuracy. Besides, since the retrieval condition can be designated for any given items to any extent of detail, the retrieval formula can be prepared so as to be compatible with the level of user's memory or recalling faculty.

We claim:

1. A document filing system for retrieving stored information based on an operator's partial or abstract description of said information comprising:

means for storing said knowledge base in which knowledge is represented in terms of concepts, each of which has a name associated therewith, relations each of which connects two of said concepts, at least some of said relations being subsumption relations, each of which is an ordered relation representing a superclass relationship between said concepts and generic relationships, each of which exists between two classes of concepts and which represent a possible relationship between two concepts each of which is a concept subsumed by one of said two classes, respectively;

means for interacting with said user for presenting guiding information from part of said knowledge base to said user, and for allowing said user to enter information necessary to register said partial or abstract descriptions to retrieve documents, and information necessary to update said knowledge base;

means for storing programs and data necessary for managing said knowledge base and for carrying out document registration and inferential retrieval;

means for controlling operations of said system according to said programs stored in said storage means, including matching an abstract description of a concept entered by said user with a concept stored in said knowledge base, means for inputting said documents, means for storing a large amount of documents inputted by said inputting means, and means for displaying the retrieved documents wherein the contents of said knowledge base is arranged in a first table means for storing tables which record at least a concept identification number and names for said concept, second table means for storing tables which record at least two concept identification numbers representing subsumption relations between two concepts, third table means for storing tables which record at least an identification number of a generic relationship which is a relationship between any two concepts which represents a possible relationship between two different concepts each of which is subsumed by one of said two concepts, respectively, and two character strings corresponding to said generic relationship for two directions, and fourth table means for storing tables which record at least two concept identification numbers and one generic relationship identification number, representing a specific relation defined between two concepts.

2. A document filing system for retrieving stored information based on an operator's partial or abstract description of said information, comprising:

means for inputting information into said system;

means for storing said information;

means for storing said information as a knowledge base;

means for storing operating programs and data for managing said knowledge base;

means for controlling operations of said system according to said operating programs and said data;

means for interacting with said operator, including a display means, and for instructing said operator;

means for retrieving desired or precise information, based on an input of a partial or abstract description of said information, input by said operator;

means for displaying at least said desired or precise information;

wherein said knowledge base comprises a plurality of concepts and a plurality of relations which may exist between said concepts;

said plurality of concepts forming a concept tree and representing a taxonomic hierarchy having a first concept representing a universal concept and all remaining concepts being subsumed, either directly or indirectly, by said universal concept; and said relations including, generic relations, each of which represents at least one of a link between a first predetermined concept and a second predetermined concept, a link between said first predetermined concept and a concept subsumed by said second predetermined concept, and a link between said second predetermined concept and a concept subsumed by said first predetermined concept; and instance relations, each of which represents a link between a concept subsumed by said first predetermined concept and a concept subsumed by said second predetermined concept.

3. A document filing system according to claim 2 wherein said means for storing said information as a knowledge base includes a first memory means fr storing at least an identification number, and a name for each concept.

4. A document filing system according to claim 3, wherein said means for storing information as a knowledge base further includes a second memory means for storing at least a list of each concept and at least one corresponding subsuming concept.

5. A document filing system according to claim 4, wherein said means for storing information as a knowledge base further includes a third memory means for storing at least a list of all said generic relations.

6. A document filing system according to claim 5, wherein said means for storing information as a knowledge base further includes a fourth memory means for storing at least a list of all said instance relations.

7. A document filing system according to claim 3, wherein said first and second predetermined concepts are superclass concepts, a superclass concept being a concept which represents the highest concept in a related class of concepts, such that all concepts in said class of concepts are subsumed by the superclass concept for said class.

8. A document filing system according to claim 7, wherein said display means displays a generic frame to said user when a new concept is input by said user, said generic frame being generated by said retrieving means based on said instance relations corresponding to all superclass concepts of said new concept.

* * * * *